United States Patent
Hong et al.

(10) Patent No.: US 11,987,221 B2
(45) Date of Patent: May 21, 2024

(54) HYDRAULIC PRESSURE SUPPLY DEVICE OF ELECTRONIC BRAKE SYSTEM

(71) Applicant: HL MANDO CORPORATION, Pyeongtaek-si (KR)

(72) Inventors: Kwang Seok Hong, Seoul (KR); Jin Yeong Kim, Seongnam-si (KR); Baik Kee Song, Seongnam-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 283 days.

(21) Appl. No.: 17/437,931

(22) PCT Filed: Mar. 12, 2020

(86) PCT No.: PCT/KR2020/003477
§ 371 (c)(1),
(2) Date: Sep. 10, 2021

(87) PCT Pub. No.: WO2020/185017
PCT Pub. Date: Sep. 17, 2020

(65) Prior Publication Data
US 2022/0169225 A1 Jun. 2, 2022

(30) Foreign Application Priority Data

Mar. 12, 2019 (KR) .................. 10-2019-0028340
Mar. 12, 2019 (KR) .................. 10-2019-0028341
(Continued)

(51) Int. Cl.
*B60T 13/74* (2006.01)
*B60T 8/36* (2006.01)
(Continued)

(52) U.S. Cl.
CPC ............ *B60T 13/745* (2013.01); *B60T 8/368* (2013.01); *B60T 13/746* (2013.01); *F16D 65/22* (2013.01);
(Continued)

(58) Field of Classification Search
CPC ....... B60T 13/745; B60T 13/741; B60T 8/368
(Continued)

(56) References Cited

U.S. PATENT DOCUMENTS 9,074,637 B2 * 7/2015 Slayne .................. F16D 1/0835
2012/0073286 A1 * 3/2012 Takayama ............. B60T 13/745
60/538
(Continued)

FOREIGN PATENT DOCUMENTS

KR 10-2016-0020530 A 2/2016
KR 10-2016-0123179 A 10/2016
(Continued)

OTHER PUBLICATIONS

English translation of KR20160123179A to Hui et al. (Year: 2023).*
(Continued)

*Primary Examiner* — Thomas E Lazo
(74) *Attorney, Agent, or Firm* — Hauptman Ham, LLP

(57) ABSTRACT

Disclosed herein a hydraulic pressure supply apparatus of an electronic brake system includes a motor coupled to a modulator block having a flow path and a valve for adjusting braking hydraulic pressure therein, the motor having a stator and a rotor disposed to be spaced apart from an inner circumferential surface of the stator; a first gear configured to receive a rotational force from the rotor and rotating together with the rotor; a second gear provided with a piston on one side thereof and concentrically connected with the first gear in a ball screw manner to convert a rotational motion of the first gear into a linear motion; and an anti-
(Continued)

rotation unit configured to prevent the second gear from rotating together with the first gear.

20 Claims, 14 Drawing Sheets

(30) Foreign Application Priority Data

Mar. 12, 2019 (KR) .......................... 10-2019-0028342
Mar. 12, 2019 (KR) .......................... 10-2019-0028343

(51) Int. Cl.
  *F16D 65/22* (2006.01)
  *F16H 25/22* (2006.01)
  *G01D 5/12* (2006.01)
  *F16D 125/10* (2012.01)
  *F16D 125/40* (2012.01)

(52) U.S. Cl.
  CPC ........... *F16H 25/2204* (2013.01); *G01D 5/12* (2013.01); *B60Y 2400/412* (2013.01); *B60Y 2400/81* (2013.01); *F16D 2125/10* (2013.01); *F16D 2125/405* (2013.01)

(58) Field of Classification Search
  USPC ........................................... 60/545
  See application file for complete search history.

(56) References Cited

U.S. PATENT DOCUMENTS

| 2012/0167565 A1* | 7/2012 | Richard | ............... B60T 13/745 |
| | | | 60/545 |
| 2017/0029017 A1* | 2/2017 | Pattok | .................. B62D 5/0448 |
| 2018/0259019 A1* | 9/2018 | Smith | ..................... F16D 65/18 |
| 2018/0345934 A1* | 12/2018 | Weh | ........................ F04B 17/03 |
| 2020/0208698 A1* | 7/2020 | Kim | ........................ F16D 65/18 |

FOREIGN PATENT DOCUMENTS

| KR | 20160123179 A | * | 10/2016 |
| KR | 10-2018-0005499 A | | 1/2018 |
| KR | 10-2018-0087357 A | | 8/2018 |
| KR | 10-1917961 B1 | | 11/2018 |

OTHER PUBLICATIONS

Korean Office Action dated Apr. 24, 2023, in connection with the Korean Patent Application No. 10-2021-7032698, 20 pages, machine translation, citing the above reference(s).

International Search Report dated Jul. 8, 2020, corresponding to International Application No. PCT/KR2020/003477 citing the above reference(s).

* cited by examiner

HYDRAULIC PRESSURE SUPPLY DEVICE OF ELECTRONIC BRAKE SYSTEM

CROSS-REFERENCE TO RELATED APPLICATION

The present application is a national stage filing under 35 U.S.C § 371 of PCT application number PCT/KR2020/003477 filed on Mar. 12, 2020, which is based upon and claims the benefit of priorities to Korean Patent Application Nos. 10-2019-0028340, 10-2019-0028341, 10-2019-0028342, and 10-2019-0028343 filed on Mar. 12, 2019, in the Korean Intellectual Property Office. All of the aforementioned applications are hereby incorporated by reference in their entireties.

TECHNICAL FIELD

The disclosure relates to a hydraulic pressure supply apparatus, and more particularly, to a hydraulic pressure supply apparatus provided in an electronic brake system to generate hydraulic pressure.

BACKGROUND ART

In general, a brake system for braking is essential to a vehicle, and recently, various types of electronic brake systems have been proposed to obtain a more powerful and stable braking force. As an example, an integrated dynamic brake (IDB) system has been proposed. The IDB system generates a stable and powerful braking force by integrating a master booster and an electronic stability control (ESC).

Such an integrated electronic brake system includes a hydraulic pressure supply apparatus that outputs the operation of a brake pedal as an electrical signal through a pedal displacement sensor, operates a motor, and converts a rotational force of the motor into a linear motion to generate braking hydraulic pressure, a modulator block installed with a plurality of valves to control a braking operation by receiving hydraulic pressure with the force generated by the hydraulic pressure supply apparatus, and an electronic control unit that controls the motor and the valves.

More specifically, in an integrated electronic brake system, the hydraulic pressure supply apparatus operates according to the operation of a brake pedal to generate braking pressure required by a driver and transfers hydraulic pressure to wheel cylinders installed in each wheel. In this case, the hydraulic pressure supply apparatus includes a motor, a pinion gear rotated by the motor, and a rack gear that linearly moves while engaged with the pinion gear. In other words, the hydraulic pressure supply apparatus is installed so that the pinion gear is engaged with a opposite surface of the rack gear, so that the rack gear is linearly moved.

However, because the hydraulic pressure supply apparatus having the above configurations is driven in a rack-and-pinion method to generate braking pressure, the size of a rack gear driving device portion increases and the weight thereof is also excessively increased. This ultimately reduce mountability in a vehicle and a lay-out design of a vehicle.

DISCLOSURE

Technical Problem

The disclosure are intended to provide a hydraulic pressure supply apparatus of an electronic brake system that operates with a simple structure using a ball screw method.

Further, the disclosure provide a hydraulic pressure supply apparatus of an electronic brake system capable of minimizing the overall length of the electronic brake system and preventing excessive weight increase by simplifying the structure.

Further, the disclosure are intended to provide a hydraulic pressure supply apparatus of an electronic brake system that can improve assembly and productivity, and can implement a compact size.

Technical Solution

In accordance with an aspect of the disclosure, a hydraulic pressure supply apparatus of an electronic brake system includes a motor coupled to a modulator block having a flow path and a valve for adjusting braking hydraulic pressure therein, the motor having a stator and a rotor disposed to be spaced apart from an inner circumferential surface of the stator; a first gear configured to receive a rotational force from the rotor and rotating together with the rotor; a second gear provided with a piston on one side thereof and concentrically connected with the first gear in a ball screw manner to convert a rotational motion of the first gear into a linear motion; and an anti-rotation unit configured to prevent the second gear from rotating together with the first gear.

The first gear may be provided as a screw shaft, and the second gear may be provided as a ball nut, the first gear and the second gear converting the rotational motion into the linear motion by a ball screw manner, and the anti-rotation unit includes a bush member including at least one slot formed on an inner circumferential surface thereof in a moving direction of the piston and coupled to the modulator block; and a ring member coupled to the second gear and provided with a constraining protrusion inserted into the at least one slot; wherein the constraining protrusion is configured to restrict rotation of the second gear while moving along the at least one slot when the piston is operated.

The bush member may include an annular disk-shaped flange bush fixed to the modulator block, and a guide bush protruding from the flange bush toward the motor and having the at least on slot formed on an inner circumferential surface thereof.

The first gear may be coupled to the rotor by a tolerance ring, and the tolerance ring may be configured to allow a relative rotational motion for the rotor when a torque greater than an allowable value is applied to the first gear.

The first gear may be provided as a ball nut, and the second gear may be provided as a screw shaft, the first gear and the second gear converting a rotational motion into a linear motion by a ball screw manner, an anti-rotation hole may be formed on the other side of the second gear, the anti-rotation unit comprises a rotation constraining member installed on a motor housing and having a guide shaft protruding to be inserted into the anti-rotation hole.

The rotation constraining member may include a fastening body from which the guide shaft protrudes, and a tolerance ring provided on an outer circumferential surface of the fastening body and fastened to the motor housing, and the tolerance ring may be configured to allow a relative rotational motion for the motor housing when a torque greater than an allowable value is applied to the rotation constraining member.

The anti-rotation unit may further include a bush member having a constraint hole through which the guide shaft passes, and coupled to the other side of the second gear.

The hydraulic pressure supply apparatus may further include a motor housing accommodating the stator and the rotor, and coupled to the modulator block; a constraining member coupled to an opening side of the motor housing coupled to the modulator block; and a nut bearing interposed between the constraining member and the rotor; wherein the constraining member is configured to support an outer ring of the nut bearing, and the rotor is configured to support an inner ring of the nut bearing.

The hydraulic pressure supply apparatus may further include a motor housing accommodating the stator and the rotor, and coupled to the modulator block, wherein the bush member is configured to cover an inside of the motor housing by coupling to an opening side of the motor housing coupled to the modulator block.

Further, a nut bearing may be interposed between the bush member and the rotor, and the bush member may be configured to support an inner ring of the nut bearing, and the rotor is configured to support an outer ring of the nut bearing.

The first gear may be provided as a ball nut, and the second gear is provided as a screw shaft, and a nut bearing for a shaft support may be integrally provided with the first gear.

The hydraulic pressure supply apparatus may further include a seating bush fitted into a fastening groove formed in the modulator block and having a protrusion extending in a motor direction at an edge thereof; a constraining member that covers the seating bush from the outside thereof and is coupled to the modulator block; wherein a flange portion protruding outward in a radial direction is integrally provided on an outer surface of the nut bearing, and the flange portion is fitted and constrained between the seating bush and the constraining member.

The hydraulic pressure supply apparatus may further include a position sensor unit including a sensing magnet fastened to an outer circumferential surface of the first gear and rotating together with the first gear, and a sensing unit measuring a rotation amount of the sensing magnet by detecting a change in a magnetic field.

The hydraulic pressure supply apparatus may further include a motor housing accommodating the stator and the rotor, and coupled to the modulator block; and a pump housing coupled to the modulator block from the opposite side the motor housing, and forming a cylinder such that a piston passing through the modulator block reciprocates linearly.

The anti-rotation unit may include a bush member including an anti-rotation hole having a polygonal cross section, the bush member fastened to a piston hole formed in the piston; and a rotation constraining member inserted into the anti-rotation hole to restrict the rotation of the bush member.

The bush member may include a fastening body provided with the anti-rotation hole, and a tolerance ring installed on an outer circumferential surface of the fastening body to fastened to the piston; and the tolerance ring may be configured to allow a relative rotational motion for the piston when a torque greater than an allowable value is applied to the piston.

The rotation constraining member may include a constraining shaft press-fitted and fixed to the pump housing, the constraining shaft having an outer circumferential surface serrated, and a guide shaft protruding from the constraining shaft and having a cross section corresponding to the anti-rotation hole.

The hydraulic pressure supply apparatus may further include a sleeve coupled to the rotor to rotate together with the rotor, and having an accommodation space formed in a center thereof.

The hydraulic pressure supply apparatus may further include a front bearing and a rear bearing installed on front and rear sides of the sleeve to rotatably support the sleeve, respectively, wherein a flange portion protruding in a radial direction is integrally provided on an outer surface of the front bearing to support an axial force.

The hydraulic pressure supply apparatus may further include a motor housing accommodating the stator and the rotor, and coupled to the modulator block; a constraining member interposed between the modulator block and the motor housing to support a rear of the flange portion; and a constraining ring provided in the constraining member to support a front of the flange portion.

Advantageous Effects

The hydraulic pressure supply apparatus of the electronic brake system according to the embodiment of the disclosure may be operated with a simple structure because it uses a ball screw method to transmit the rotational force of the rotor to the piston.

Further, in the hydraulic pressure supply apparatus of the electronic brake system according to the embodiment of the disclosure, the anti-rotation unit is not provided in the pump housing or the motor housing, but is performed by the bush member coupled to the modulator block, thereby reducing an axial size of the motor.

Further, in the hydraulic pressure supply apparatus of the electronic brake system according to the embodiment of the disclosure, the bush member not only prevents the piston from rotating, but also catches the vibration of the piston integrated with the second gear, thereby serving as a piston guide to prevent deterioration of sealing performance of the sealing member.

Further, in the hydraulic pressure supply apparatus of the electronic brake system according to the embodiment of the disclosure, the bush member is press-fitted the rear end of the second gear including the anti-rotation hole having an end of a depth longer than the stroke to support the rotation constraining member, thereby performing anti-rotation and a sliding function. Moreover, the anti-rotation hole in the second gear is used as anti-rotation means, so there is an advantage of utilizing space for the forward and backward stroke of the second gear.

Further, in the hydraulic pressure supply apparatus of the electronic brake system according to the embodiment of the disclosure with the tolerance ring, when an excessive load is applied due to the rotation of shaft and the axial direction collision, the relative rotation is enabled, thereby preventing damage to related components and further performing the original function by the restoring force of the tolerance ring after the collision.

Further, in the hydraulic pressure supply apparatus of the electronic brake system according to the embodiment of the disclosure, the nut bearing for support the shaft may be provided integrally with the first gear, so a separate assembly member, for example, a C-ring, a Lock Nut, etc., for receiving strong axial force is unnecessary, which has advantages in packaging and rigidity.

Further, the hydraulic pressure supply apparatus of the electronic brake system according to the embodiment of the disclosure may include the flange portion protruding radially outward from the outer surface of the nut bearing. Accordingly, a separate fastening member is not required, so that the size of the motor in the axial direction may be reduced.

Further, the hydraulic pressure supply apparatus of the electronic brake system according to the embodiment of the disclosure may include the sensing magnet fixed to the outer circumferential surface of the first gear and rotating in the circumferential direction of the first gear, and the sensing unit for measuring a magnetic field change by the sensing magnet. Accordingly, it is possible to effectively grasp a rotation amount of the first gear and the piston advance distance thereby.

Further, the hydraulic pressure supply apparatus of the electronic brake system according to the embodiment of the disclosure may be operated with a simple structure by integrally forming the ball nut and the piston.

Further, the hydraulic pressure supply apparatus of the electronic brake system according to the embodiment of the disclosure may have the effect of minimizing the overall length of the electronic brake system by arranging the gear and the piston in the accommodation space provided at the center of the motor.

Further, the hydraulic pressure supply apparatus of the electronic brake system according to the embodiment of the disclosure may have the effect of preventing the vibration of the piston through the guide bush, as well as holding the concentricity of the piston to prevent sealing performance of the sealing member from being deteriorated. .

MODES OF THE INVENTION

Figure 1:
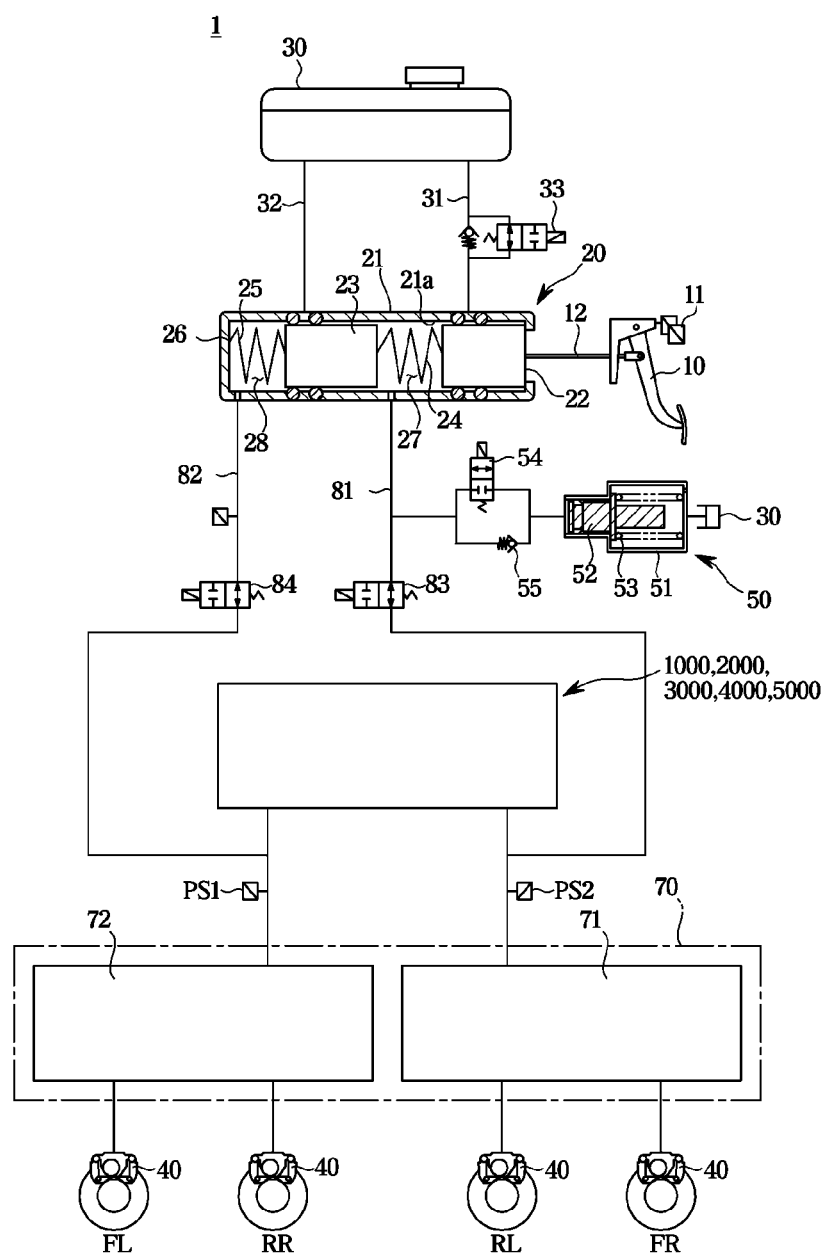
FIG. 1 is a hydraulic circuit diagram showing a non-braking state of a hydraulic circuit diagram of an electronic brake system.

Hereinafter, embodiments of the disclosure will be described in detail with reference to the accompanying drawings. The embodiments described below are provided by way of example so that those skilled in the art can fully understand the spirit of the present disclosure. The disclosure is not limited to the embodiments described below, but may be embodied in other forms. In order to clearly illustrate the disclosure, parts not related to the description are omitted from the drawings. In the drawings, the width, length, thickness, etc. of components may be exaggerated for convenience. Like reference numerals designate like elements throughout the specification.

FIG. 1 is a hydraulic circuit diagram showing a non-braking state of a hydraulic circuit diagram of an electronic brake system.

Referring to FIG. 1, an electronic brake system 1 generally includes a master cylinder 20 that generates hydraulic pressure, a reservoir 30 coupled to an upper portion of the master cylinder 20 to store oil, an input rod 12 that presses the master cylinder 20 according to a pedal effort, wheel cylinders 40 for braking each wheel (RR, RL, FR, and FL) by receiving hydraulic pressure, a pedal displacement sensor 11 for detecting a displacement of a brake pedal 10, and a simulation device 50 for providing a reaction force according to the pedal effort of the brake pedal 10.

The master cylinder 20 is configured to have at least one chamber in a cylinder body 21 to generate hydraulic pressure. For example, the master cylinder 20 includes a first cylinder chamber 27 and a second cylinder chamber 28 in a bore 21a formed in the cylinder body 21.

A first piston 22 connected to the input rod 12 is provided in the first cylinder chamber 27, and a second piston 23 is provided in the second cylinder chamber 28. Furthermore, the first cylinder chamber 27 is connected to a first backup flow path 81 so that oil enters and exits, and the second cylinder chamber 28 communicates with a second backup flow path 82 so that oil enters and exits.

A first spring 24 is provided between the first piston 22 and the second piston 23, and a second spring 25 is provided between the second piston 23 and a cap 26. The first spring 24 and the second spring 25 are compressed by the first piston 22 and the second piston 23 that move as the displacement of the brake pedal 10 changes, and thus the elastic force thereof is stored. In addition, when a force pushing the first piston 22 is smaller than the elastic force, the first and second pistons 22 and 23 are pushed back to their original state by using the restoring elastic force stored in the first spring 24 and the second spring 25.

The input rod 12 for pressing the first piston 22 of the master cylinder 20 is in close contact with the first piston 22 and when the brake pedal 10 is depressed, the input rod 12 may press the master cylinder 20 directly without a pedal invalid stroke section. Furthermore, the first cylinder chamber 27 is connected to the reservoir 30 through the first reservoir flow path 31, and the second cylinder chamber 28 is connected to the reservoir 30 through the second reservoir flow path 32.

The simulation device 50 is connected to the first backup flow path 81 to be described later to provide a reaction force in response to the pedal effort of the brake pedal 10. By providing the reaction force that compensates for the pedal effort provided by a driver, the driver may finely adjust the braking force as intended. In other words, when the first piston 22 is pressed in response to the pedal effort of the brake pedal 10, the hydraulic pressure discharged from the first cylinder chamber 27 is delivered to the simulation device to provide a pedal feel to the driver.

The simulation device 50 includes a simulation chamber 51 provided to store an oil flowing out from the first cylinder chamber 27, a reaction force piston 52 provided in the simulation chamber 51, and a reaction force spring 53 for elastically supporting the reaction force piston 52, and a simulator valve 54 connected to a front end of the simulation chamber 51.

The reaction force piston 52 and the reaction force spring 53 are installed to have a displacement within a certain range in the simulation chamber 51 by the oil flowing into the simulation chamber 51. Herein, the reaction force spring 53 shown in the drawings is merely one embodiment capable of providing an elastic force to the reaction force piston 52, and may include various embodiments capable of storing the elastic force by shape deformation. For example, it may include a variety of members capable of storing the elastic force by being provided with a rubber material or having a coil or plate shape.

The simulator valve 54 is provided in a flow path connecting the first backup flow path 81 and the simulation chamber 51. In addition, the front end of the simulation chamber 51 is connected to the master cylinder 20 through the simulator valve 54 and the first backup flow path 81, and a rear end of the simulation chamber 51 is connected to the reservoir 30.

The simulator valve 54 is provided as a closed type solenoid valve that normally maintains a closed state. The simulator valve 54 is opened when the driver applies the pedal effort to the brake pedal 10 to deliver the oil in the simulation chamber 51 to the reservoir 30. Furthermore, when the reaction force piston 52 returns while the simulator valve 54 is open, the oil in the reservoir 30 flows in and the entire interior of the simulation chamber 51 is filled with the oil.

Furthermore, the simulator device 50 may include a simulator check valve 55 connected in parallel with the simulator valve 54. The simulator check valve 55 allows only the oil in the simulation chamber 51 to flow into the first cylinder chamber 27 and blocks the oil in the first cylinder chamber 27 to flow into the simulation chamber 51 through a flow path in which the check valve 55 is installed. Accordingly, the oil in the simulation chamber 51 may flow out through the simulator check valve 55 when the pedal effort of the brake pedal 10 is released, so that a quick return of the pressure of the simulation device is ensured.

The operation of the pedal simulation device 50 will be described. When the driver applies a pedal force to the brake pedal 10, the oil flowing in through the open simulator valve 54 pressurizes the reaction force piston 52 of the simulation device. And, the oil in the simulation chamber 51 pushed by the reaction force piston 52 while compressing the reaction force spring 53 is delivered to the reservoir 30. And in this process, the driver is provided with a pedal feel.

Conversely, when the driver releases the pedal effort of the brake pedal 10, the reaction force piston 52 from which the pressure is released returns to its original position by the elastic force of the reaction force spring 53, and the oil in the reservoir 30 flows into the simulation chamber. Accordingly, the oil may be filled inside the simulation chamber 51. Meanwhile, the oil filled in the front end of the reaction force piston 52 in the simulation chamber 51 returns to the master cylinder 20 through a flow path in which the simulator valve 54 is installed and a flow path in which the check valve 55 is installed.

As such, because the inside of the simulation chamber 51 is always filled with the oil in a braking situation and a release situation, the friction of the reaction force piston 52 is minimized when the simulation device 50 is operated, so that the durability of the simulation device 50 is improved and also the inflow of foreign substances from the outside is blocked.

On the other hand, several reservoirs 30 are shown in the drawings, and each of the several reservoirs 30 use the same reference numerals. Here, the several reservoirs may be provided with the same part or may be provided with different parts. For example, the reservoir 30 connected to the simulation device 50 may be the same as the reservoir 30 connected to the master cylinder 20, or may be a reservoir that stores an oil separately from the reservoir 30 connected to the master cylinder 20.

Furthermore, the electronic brake system 1 may include hydraulic pressure supply apparatuses 1000~5000 that receives the driver's braking intention as an electrical signal from the pedal displacement sensor 11 that detects the displacement of the brake pedal 10 to operate mechanically, a hydraulic control unit 70 including first and second hydraulic circuits 71 and 72 that controls a flow of hydraulic pressure transferred to the wheel cylinders 40 provided on two wheels (RR, RL, FR, and FL), respectively, a first cut valve 83 provided in the first backup flow path 81 connecting the first cylinder chamber 27 and the first hydraulic circuit 71 to control the flow of hydraulic pressure, a second cut valve 84 provided in the second backup flow path 82 connecting the second cylinder chamber 28 and the second hydraulic circuit 72 to control the flow of hydraulic pressure, and an electronic control unit (ECU, not shown) that controls the hydraulic pressure supply apparatus 1000 to 5000 and the valves based on hydraulic pressure information and brake pedal displacement information.

The hydraulic pressure supply apparatus 1000 to 5000 provide oil pressure delivered to the wheel cylinders 40. The hydraulic pressure supply apparatus 1000 to 5000 are provided in various ways. For example, a piston (not shown) moving by a driving force of a motor (not shown) pushes oil in the chamber to transfer hydraulic pressure to the wheel cylinders 40. Alternatively, the hydraulic pressure supply apparatus 1000 to 5000 may be provided as a motor-driven pump or a high-pressure accumulator.

More specifically, when the driver depresses the brake pedal 10, an electrical signal is transmitted from the pedal displacement sensor 11 as the displacement of the brake pedal 10 changes, and the motor operates according to this signal. Furthermore, a power transmission unit for converting a rotational motion of the motor into a linear motion is provided between the motor and the piston. The power transmission unit may include a screw shaft and a ball nut, a worm and a worm gear, and a rack and a pinion gear, and the like.

The hydraulic control unit 70 may include the first hydraulic circuit 71 and the second hydraulic circuit 72 that receive hydraulic pressure to control two wheels, respectively. For example, the first hydraulic circuit 71 controls a right front wheel FR and a left rear wheel RL, and the second hydraulic circuit 72 controls a left front wheel FL and a right rear wheel RR. Furthermore, the wheel cylinders 40 are installed on each of the wheels FR, FL, RR, and RL to receive hydraulic pressure to perform braking.

The hydraulic control unit 70 includes an inlet valve (not shown) provided at a front end of each wheel cylinder 40 to control hydraulic pressure, and an outlet valve (not shown) branched between the inlet valve and the wheel cylinders 40 and connected to the reservoir 30. Meanwhile, PS1 and PS2, which are not described, are backup flow path pressure sensors that measure the oil pressure of the master cylinder 20.

In the braking operation of the electronic brake system 1 as described above, in the case of normal braking, the hydraulic pressure supply apparatus 1000 to 5000 are operated by an electric signal by detecting the displacement of the pedal according to the pedal effort of the brake pedal 10. The hydraulic pressure generated in the hydraulic pressure supply apparatus 1000 to 5000 by the pedal effort of the brake pedal 10 is transferred to each of the wheel cylinders 40 through the hydraulic control unit 70. At this time, the cut valves 83 and 84 provided in the backup flow paths 81 and 82 connecting the master cylinder 20 and the wheel cylinders 40 are switched to a closed state, resulting in blocking the hydraulic pressure of the master cylinder 20 from being transferred to the wheel cylinders 40.

Figure 2:
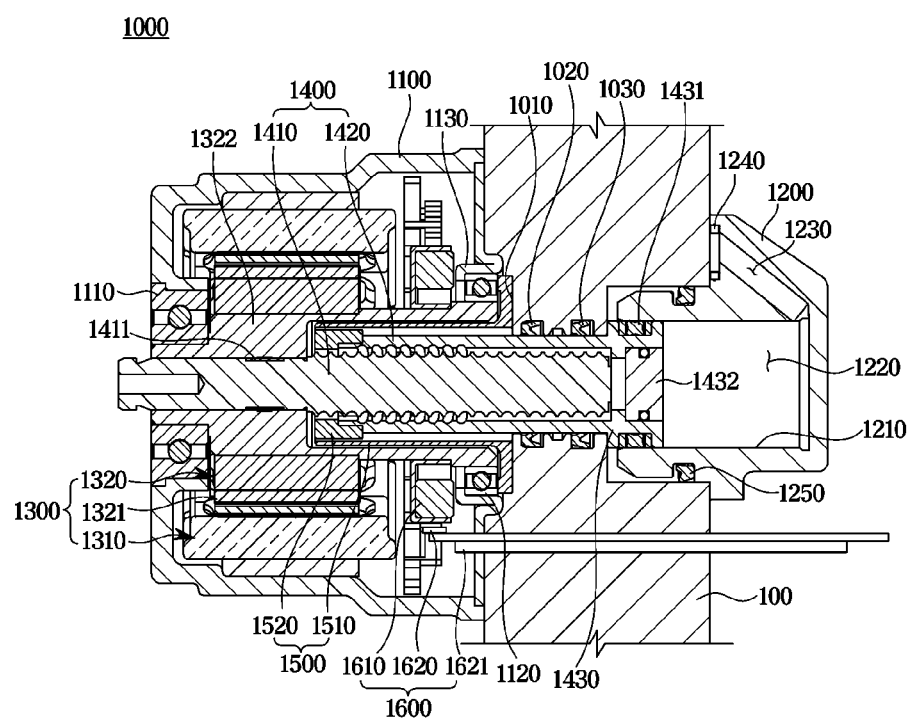
FIG. 2 is a cross-sectional view showing a hydraulic pressure supply apparatus of the electronic brake system according to a first embodiment of the disclosure.
Figure 3:
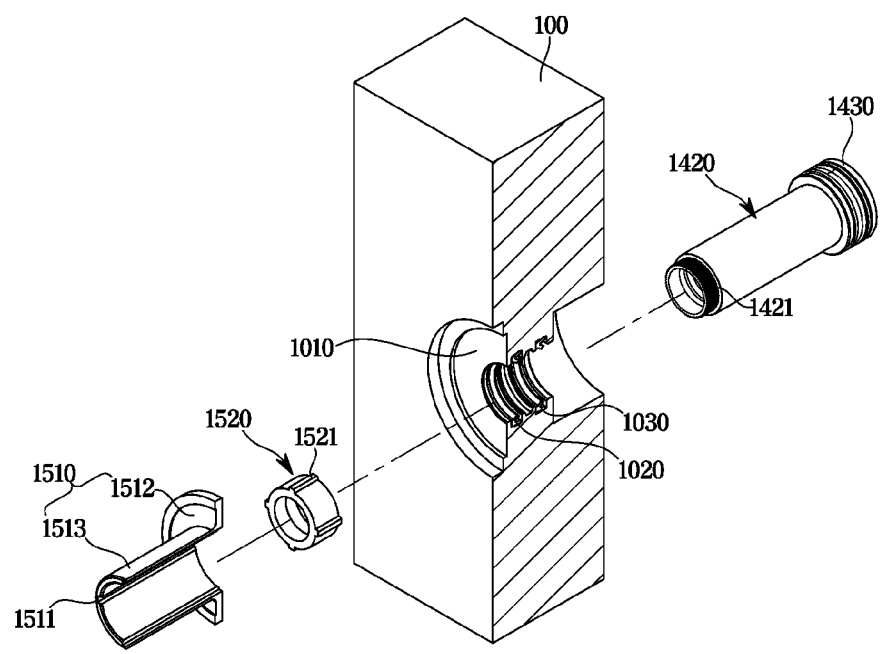
FIG. 3 is a partially-cut exploded perspective view with respect to a piston and an anti-rotation unit provided in the hydraulic pressure supply apparatus of the electronic brake system according to the first embodiment of the disclosure.
Figure 4:
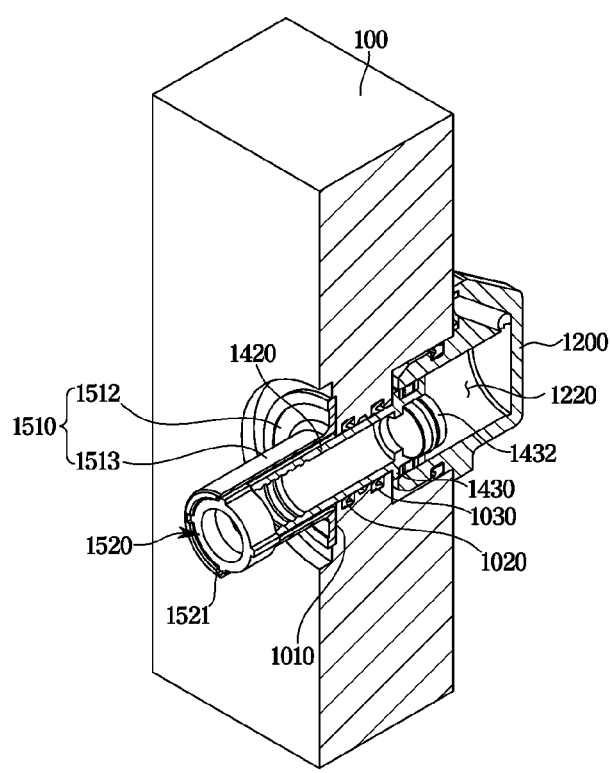
FIG. 4 is a partially-cut perspective view showing an assembled state of the piston and the anti-rotation unit of FIG. 3.
Figure 5:
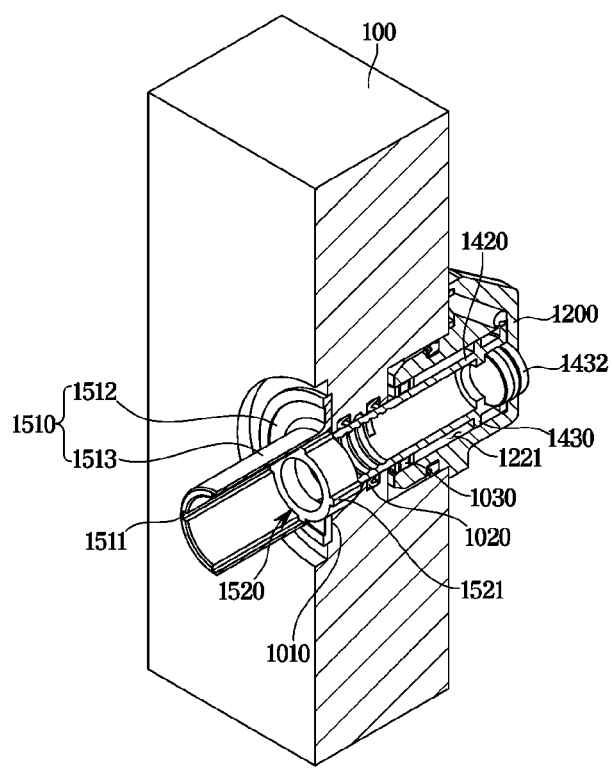
FIG. 5 is an operation state diagram of the piston having the anti-rotation unit provided in the hydraulic pressure supply apparatus of the electronic brake system according to the first embodiment of the disclosure.

FIG. 2 is a cross-sectional view showing a hydraulic pressure supply apparatus of the electronic brake system according to a first embodiment of the disclosure. FIG. 3 is a partially-cut exploded perspective view with respect to a piston and an anti-rotation unit provided in the hydraulic pressure supply apparatus of the electronic brake system according to the first embodiment of the disclosure. FIG. 4 is a partially-cut perspective view showing an assembled state of the piston and the anti-rotation unit of FIG. 3. FIG. 5 is an operation state diagram of the piston having the anti-rotation unit provided in the hydraulic pressure supply apparatus of the electronic brake system according to the first embodiment of the disclosure.

Referring to FIGS. 2 to 5, the hydraulic pressure supply apparatus 1000 according to the first embodiment of the disclosure may include a motor 1300 that is coupled to a modulator block 100 having flow paths and valves for adjusting braking hydraulic pressure therein and has a stator 1310 and a rotor 1320, which is disposed to be spaced apart from an inner circumferential surface of the stator 1310, a first gear coupled to and fixed with the rotor 1320 and rotating together with the rotor 1320, a second gear 1420 that is provided with a piston 1430 on one side thereof and is concentrically connected in a ball screw manner with the first gear 1410 to convert a rotational motion of the first gear 1410 into a linear motion, and an anti-rotation unit 1500 that prevents the second gear 1420 from rotating together with the first gear 1410.

The modulator block 100 is a housing for realizing a brake system by adjusting the braking hydraulic pressure. The modulator block 100 may include a plurality of solenoid valves (not shown), an accumulator for temporarily storing oil discharged from the wheel cylinders, and the ECU for controlling the plurality of solenoid valves and the driving of the motor.

A motor housing 1100 and a pump housing 1200 are respectively fastened to both sides of the modulator block 100. The motor housing 1100 is fastened to a left side of the modulator block 100 based on the drawings, and is provided to surround the motor 1300 to be described later. Furthermore, the pump housing 1200 is fastened to the modulator block 100 from the opposite side of the motor housing 1100, and forms a cylinder 1210 in which the piston 1430 linearly reciprocates. At this time, a pump chamber 1220 into which a working fluid is introduced is formed in the space between the cylinder 1210 and the piston 1430, and a pump sealing member 1250 for preventing an outflow of the working fluid is provided on one side of an outer surface of the pump housing 1200.

The motor 1300 generates a rotational force when power is supplied. The motor 1300 includes the stator 1310 that is supplied with power to form a magnetic field, and the rotor 1320 that rotates by a change in the magnetic field. The rotor 1320 is spaced apart from the inside of the stator 1310. A magnetic body 1321 is an element for generating a rotational force in the rotor 1320, and a plurality of the magnetic body are installed on an outer surface of the rotor 1320, and at the time, a gap is formed between the magnetic body 1321 and the stator 1310 in order to rotate without interference.

A housing bearing 1110 and a nut bearing 1120 may be provided between the motor housing 1100 and a rotating body 1322 of the motor 1300. The housing bearing 1110 is interposed between the motor housing 1100 and the rotating body 1322 to rotatably support the rotating body 1322. The nut bearing 1120 is interposed between a constraining member 1130 coupled to an opening side of the motor housing 1100 and the rotating body 1322 on the modulator block 100 side in the rotating body 1322 to rotatably support the rotating body 1322. In other words, the nut bearing 1120 is located inside the rotation body 1322 in the modulator block 100, and the housing bearing 1110 is located outside the rotation body 1322 in the motor housing 1100, so that the rotation body 1322 are stably supported in front and rear sides by the nut bearing 1120 and the housing bearing 1110, respectively.

Furthermore, an opening side of the motor housing 1100 is covered by the housing bearing 1110, the rotating body 1322 of the rotor 1320, the constraining member 1130, and the nut bearing 1120 to prevent foreign substances from entering the inside thereof. Specifically, the housing bearing 1110 is interposed between one side of the motor housing 1100 and one end of the rotating body 1322, the nut bearing 1120 is interposed between the other end of the rotating body 1322 and the constraining member 113 and the other side of the motor housing 1100. Accordingly, the stator 1310 and the rotor 1320 of the motor and various electrical components accommodated in the motor housing 1100 may be modularized with the motor housing 1100 to increase assembly with the modulator block 100. For reference, the constraining member 1130 supports an outer ring of the nut bearing 1120, and the rotating body 1322 of the rotor 1320 supports an inner ring of the nut bearing 1120. Furthermore, the constraining member 1130 is fixedly fastened to the modulator block 100 while covering a bush member 1510 to be described later that is fixed to the modulator block 100 from a left outer side.

A gear unit 1400 includes a first gear 1410 that rotates together with the rotor 1320, and a second gear 1420 that converts a rotational kinetic energy delivered from the first gear 1410 into a linear kinetic energy. In other words, the gear unit 1400 performs a function of converting the rotational motion of the rotor 1320 into the linear motion. The first gear 1410 is fixedly coupled to the rotor 1320 and rotates therewith, and the second gear 1420 integrally formed behind the piston 1430 performs the linear reciprocating motion. At this time, the rotation of the integrally formed piston 1430 and the second gear 1420 is restricted so that the rotational motion may be converted into the linear motion. The structure in which the rotation is restricted will be described again below.

The first gear 1410 is bound to the rotor 1320 by a tolerance ring 1411, and the tolerance ring 1411 allows a relative rotational motion for the rotor 1320 when a torque greater than an allowable value is applied to the first gear 1410. In other words, the tolerance ring 1411 has a protrusion on its outer surface and the protrusion is provided with an elastic part deformable by an external force. By coupling the protrusion of the first gear 1410 to the rotating body 1322 of the rotor 1320, it prevents the first gear 1410 from being damaged or destroyed by excessive torque, or from spinning in vain due to damage to a fastening part in advance.

The second gear 1420 may be performed by converting the rotational motion into the linear reciprocating motion by being coupled to the first gear 1410 in a ball-screw manner To this end, the first gear 1410 may be provided in the form of a screw shaft, and the second gear 1420 may be provided in the form of a ball nut. In other words, a thread is formed on an outer circumferential surface of the first gear 1410, and a thread groove (or internal thread) corresponding to the thread is formed on an inner circumferential surface of the second gear 1420. Accordingly, when the first gear 1410 rotates, the second gear 1420, which is constrained not to rotate in the modulator block 100, performs the relatively linear motion. At this time, although not shown, a plurality of balls may be provided between the first gear 1410 and the second gear 1420 to reduce energy due to friction.

The piston 1430 includes a cylindrical body and a head having a larger diameter than the cylindrical body, and the second gear 1420 is integrally formed therein. The cylindrical body of the piston is inserted into a hole formed in the modulator block 100 and moves forward and backward, the head of the piston is provided in the structure in which movement is restricted by being caught by the modulator block 100 when the cylindrical body is moved backward. The piston 1430 may have a through hole formed at a rear end thereof in a longitudinal direction, and a nut portion of the second gear 1420 may be formed on an inner surface of the through hole. Furthermore, the piston 1430 may include a piston hole into which a pressing member 1432 forming a pressing surface is fitted in the front thereof, and a piston sealing member 1431 for sealing the space between the piston and the cylinder 1210. Herein, a case in which the piston 1430 moves to the right in the drawing is forward, and a case in which the piston 1430 moves to the left is backward.

The pump chamber 1220 is provided in front of the piston 1430, and the piston 1430 pressurizes the working fluid accommodated while advancing inside the pump chamber 1220 to form hydraulic pressure. Meanwhile, when the piston 1430 is advanced, the other pump chamber 1221 in FIG. 5 forming a closed space by the piston 1430, the modulator block 100, and the pump housing 1200 may be provided at a rear thereof. In other words, with reference to the drawings, a front pump chamber 1220 in FIG. 4 and a rear pump chamber 1221 in FIG. 5 are formed in front and rear sides of the piston 1430, respectively, and when the piston 1430 moves forward, the hydraulic pressure may be formed through the front pump chamber 1220 and when the piston 1430 moves backward, the hydraulic pressure may be formed through the rear pump chamber 1221. In this case, a first sealing member 1020 and a second sealing member 1030 are provided in the modulator block 100, and a part thereof is provided to be contacted with the piston 1430 to prevent the working fluid from leaking.

The working fluid accommodated in the pump chamber 1220 whose volume is changed by the piston 1430 flows in and out toward the modulator block 100 through a flow path 1230. Herein, a sealing member 1240 is provided in a coupling portion between the modulator block 100 and the pump housing 1200 to prevent a leakage of the working fluid flowing through the flow path 1230.

The anti-rotation unit 1500 is provided between the rotor 1320 and the second gear 1420 to prevent the ball nut serving as the second gear 1420 from rotating together with the screw shaft serving as the first gear 1410.

The anti-rotation unit 1500 includes a bush member 1510 that has at least one slot 1511 formed on an inner surface along a moving direction of the piston 1430, and is fixedly coupled to the motor 1300 side in the modulator block 100, and a ring member 1520 that has s constraining protrusion 1521 inserted into the slot 1511, and is fastened to the second gear 1420. In other words, the slot 1511 serves as a guide rail and the constraining protrusion 1521 moves along the slot 1511, so the rotation of the piston 1430 integrally formed with the second gear 1420 is restricted. Accordingly, the second gear 1420 may convert the rotational motion of the first gear 1410 coupled with the second gear in the ball screw manner into the forward and backward linear motion of the first piston 1430.

The bush member 1510 includes an annular disk-shaped flange bush 1512 fixed to a fastening groove 1010 of the modulator block 100, and a cylindrical guide bush 1513 protruding from the flange bush 1512 toward the motor 1300 and has the slot 1511. The bush member 1510 is made of a plastic material and is coupled to the fastening groove 1010 of the modulator block 100. At this time, a plurality of the slots 1511 formed along the longitudinal direction on an inner surface of the guide bush 1513 are provided parallel to each other at equal intervals in a circumferential direction, and the number of the constraining protrusions 1521 of the ring member 1520 are also be provided corresponding to the slots 1511, so that the rotation of the second gear 1420 by the rotation of the first gear 1410 may be stably restricted.

Furthermore, the bush member 1510 not only prevents the rotation of the piston 1430 on which the second gear 1420 is formed, but also compensates a vibration of the piston 1430 due to the ball screw operation, so that the bush member 1510 may also serves as a piston guide to prevent deterioration of the sealing performance of the first sealing member 1020 and the second sealing member 1030. Therefore, the device restricting the rotation of the piston 1430 is not provided in the pump housing 1200 or the motor housing 1100, and the bush member 1510 coupled to the modulator block 100 to serve as the piston guide performs the role, thereby reducing the size of the motor 1300 in an axial direction.

The ring member 1520 is assembled by being press-fitted to an insert tip 1421 serrated at the second gear 142, or at an end of the motor 1300 side of the piston 1430. The ring member 1520 having the constraining protrusion 1521 formed on an outer surface thereof may be provided integrally with the second gear 1420 at the rearmost part of the sliding operation.

Furthermore, the ring member 1520 may be easily assembled from the bush member 1510 side to the insert tip 1421 of the second gear 1420 coupled through the piston side of the modulator block 100 to which the bush member 1510 is first fixed, as shown in FIG. 3. The ring member 1520 may be provided integrally with the second gear 1420 at the rear of the portion used for sliding.

On the other hand, a position sensor unit 1600 includes a sensing magnet 1610 fixed to the outer circumferential surface of the rotating body 1322 and rotating in a circumferential direction of the rotating body 1322, and a sensing unit 1620 spaced apart from the sensing magnet 1610 and detecting a magnetic field change by the sensing magnet 1610, and the position sensor unit 1600 measures an amount of rotation. Through this, the amount of rotation of the first gear 1410 and a forward distance of the piston 1430 may be effectively identified.

On the other hand, the ECU (not shown) is a configuration coupled to one side of the modulator block 100, and may be provided as a printed circuit board (PCB) (not shown) on which electrical components for controlling the motor 1300 and the solenoid valves are mounted. The sensing unit 1620 for detecting the rotation amount of the sensing magnet 1610 is connected to the PCB, and measurement information may be transmitted to the PCB through a connector 1621.

Figure 6:
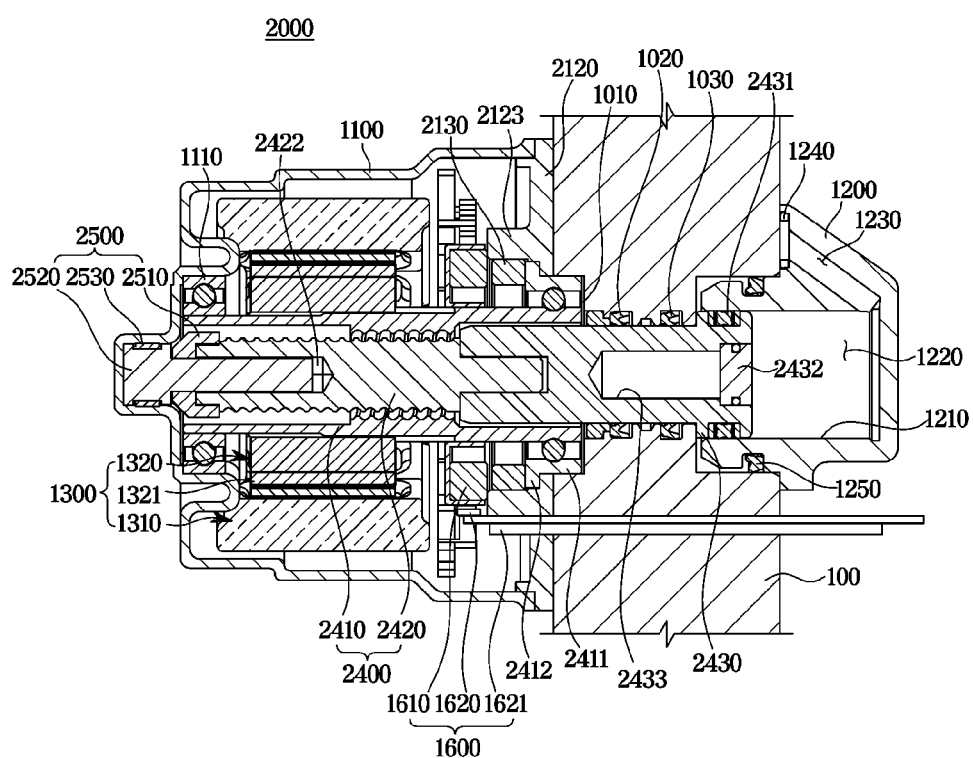
FIG. 6 is a cross-sectional view showing a part of a hydraulic pressure supply apparatus of an electronic brake system according to a second embodiment of the disclosure.
Figure 7:
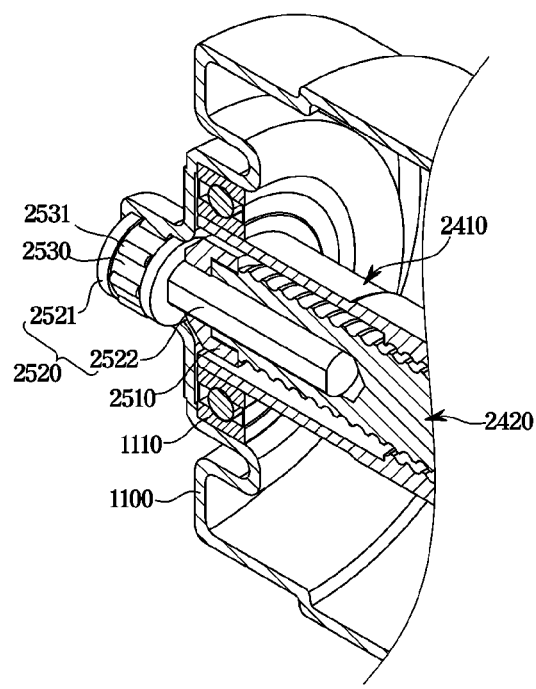
FIG. 7 is a partially-cut perspective view of an anti-rotation unit provided in the hydraulic pressure supply apparatus of the electronic brake system according to the second embodiment of the disclosure.
Figure 8:
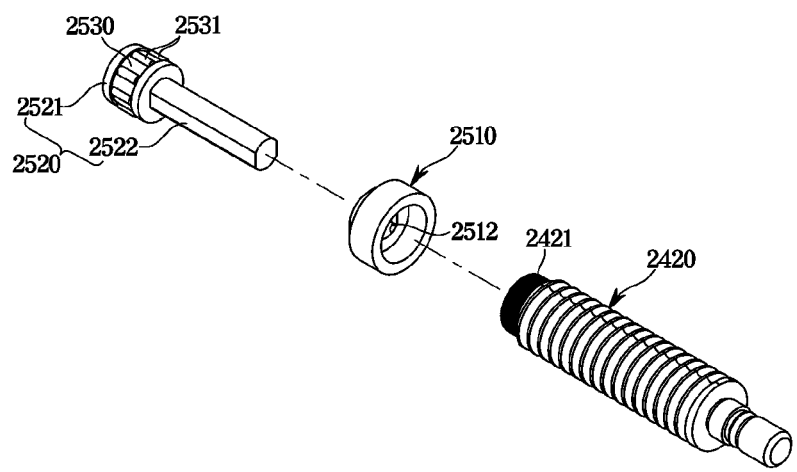
FIG. 8 is an exploded perspective view of the anti-rotation unit provided in the hydraulic pressure supply apparatus of the electronic brake system according to the second embodiment of the disclosure.

FIG. 6 is a cross-sectional view showing a part of a hydraulic pressure supply apparatus of an electronic brake system according to a second embodiment of the disclosure. FIG. 7 is a partially-cut perspective view of an anti-rotation unit provided in the hydraulic pressure supply apparatus of the electronic brake system according to the second embodiment of the disclosure. FIG. 8 is an exploded perspective view of the anti-rotation unit provided in the hydraulic pressure supply apparatus of the electronic brake system according to the second embodiment of the disclosure. Herein, the same reference numerals as in the drawings of the first embodiment shown above refer to members performing the same functions, and descriptions thereof will be omitted to prevent duplication of contents.

Referring to FIGS. 6 to 8, a hydraulic pressure supply apparatus 2000 according to the second embodiment of the disclosure includes a first gear 2410 rotating together with a rotor 1320, a second gear 2420 that is provided with a piston 2430 on one side thereof and is concentrically connected in a ball screw manner with the first gear 2410 to convert a rotational motion of the first gear 2410 into a linear motion, and an anti-rotation unit 2500 that prevents the second gear 2420 from rotating together with the first gear 2410.

The motor housing 1100 and the pump housing 1200 are respectively fastened to both sides of the modulator block 100. The motor housing 1100 is fastened to the left side of the modulator block 100 based on the drawings, and is provided to surround the motor 1300. Furthermore, the pump housing 1200 is fastened to the modulator block 100 from the opposite side of the motor housing 1100, and forms the cylinder 1210 in which the piston 2430 linearly reciprocates. At this time, the pump chamber 1220 into which the working fluid flows is formed in the space between the cylinder 1210 and the piston 2430.

A gear unit 2400 includes a first gear 2410 that rotates together with the rotor 1320, and a second gear 2420 that converts a rotational kinetic energy delivered the first gear 2410 into a linear kinetic energy. In other words, the gear unit 2400 performs a function of converting the rotational motion of the rotor 1320 into the linear motion. The first gear 2410 is fixedly coupled to the rotor 1320 and rotates therewith, and the second gear 2420 coupled to a rear side of the piston 2430 performs the linear reciprocating motion.

A nut bearing 2411 for a shaft support may be integrally provided on the first gear 2410. Furthermore, the housing bearing 1110 has an outer diameter part fastened to the motor housing 1100 and an inner diameter part rotatably supporting the first gear 2410, after all, the nut bearing 2411 is located on the modulator block 100 side, and the housing bearing 1110 is positioned on the outside of the stator 1310, so that the first gear 2410 is stably supported in front and rear sides by the nut bearing 2411 and the housing bearing 1110, respectively.

A flange portion 2412 protruding outward in a radial direction is provided on an outer surface of the nut bearing 2411 to support an axial force. The flange portion 2412 is fitted between a fastening member 2120 and a constraining member 2130 to be constrained. In other words, the fastening member 2120 is fitted in the fastening groove 1010 formed in the modulator block 100, and has a protrusion 2123 extending in the direction of the motor 1300 on an outer surface thereof. The constraining member 2130 is fitted into the protrusion 2123, so that the flange portion 2412 is interposed between the fastening member 2120 and the constraining member 2130.

The second gear 2420 is coupled to the first gear 2410 in a ball-screw manner to perform the linear reciprocating motion. To this end, the second gear 2420 serves as a screw shaft, and the first gear 2410 serves as a ball nut. In other words, a thread is formed on one side of an outer circumferential surface of the second gear 2420, and a thread groove (or internal thread) corresponding to the thread is formed on one side of an inner circumferential surface of the first gear 2410. Accordingly, when the first gear 2410 rotates, the second gear 2420 performs the linear motion. At this time, although not shown, a plurality of balls may be provided between the first gear 2410 and the second gear 2420 to reduce energy due to friction.

The piston 2430 is provided with a structure in which the body thereof is inserted into the hole formed in the modulator block 100, and the head thereof has a structure in which movement is restricted by being caught by the modulator block 100 when the body is moved backward. The piston 2430 has a through hole formed at a rear end thereof, and the first gear 2410 is press-fitted into the through hole. Accordingly, when the first gear 2410 moves forward and backward, the piston 2430 may also reciprocate forward and backward therewith. The piston 2430 is provided with a piston hole 2433 into which a pressing member 2432 is fitted in front thereof, and a piston sealing member 2431 for sealing the space between the cylinder 1210 and the piston. Herein, a case in which the piston 2430 moves to the right in the drawing is forward, and a case in which the piston 2430 moves to the left is backward.

The pump chamber 1220 is provided in front of the piston 2430, and the piston 2430 pressurized the working fluid accommodated in the pump chamber 1220 to form hydraulic pressure. The working fluid accommodated in the pump chamber 1220 whose volume is changed by the piston 2430 flows in and out toward the modulator block 100 through the flow path 1230.

The anti-rotation unit 2500 is installed in the motor housing 1100 and includes a rotation constraining member 2520 having a guide shaft 2522. The guide shaft 2522 of the rotation constraining member 2520 protrudes toward the second gear 2420 and is inserted into an anti-rotation hole 2422. At this time, the anti-rotation hole 2422 of the second gear 2420 is formed on the opposite side of the piston 2430.

The anti-rotation unit 2500 prevents the rotation of the second gear 2420 by using the guide shaft 2522. That is, the guide shaft 2522 having a polygonal cross section and the second gear 2420 having the anti-rotation hole 2422 having a cross section corresponding thereto are provided, and when the piston 2430 rotates, the anti-rotation hole 2422 of the second gear 2420 is caught on the guide shaft 2522 so that the second gear 2420 does not rotate, thereby converting the rotational motion of the first gear 2410 into a forward motion of the gear 2420.

A bush member 2510 is fastened to the opposite side of the piston 2430 of the second gear 2420. The bush member 2510 includes a constraint hole 2512 through which the guide shaft 2522 passes, and is press-fitted into a serrated insertion part 2421 at the end of the second gear 2420.

On the other hand, the rotation constraining member 2520 includes a fastening body 2521 from which the guide shaft 2522 protrudes, and a tolerance ring 2530 provided along an outer circumferential surface of the fastening body 2521 and fastened to the motor housing 1100. The tolerance ring 2530 allows a relative rotational motion for the motor housing 1100 when a torque greater than an allowable value is applied to the rotation constraining member 2520. In other words, the tolerance ring 2530 has a protrusion on its outer surface and the protrusion is provided with an elastic part 2531 that is deformable by an external force. By coupling this part of the rotation constraining member 2520 to the motor housing 5510, it prevents the rotation constraining member 2520 from being damaged or destroyed by excessive torque, or from spinning in vain due to damage to a fastening part in advance. The tolerance ring 2530 may perform its original function by a restoring force even after a collision.

Therefore, in the hydraulic pressure supply apparatus 2000 according to the disclosure, because the nut bearing 2411 for a shaft support is integrally provided with the first gear 2410, a separate assembly member, for example, a C-ring, a Lock Nut, etc., is unnecessary, which has advantages in packaging and rigidity. Furthermore, the flange portion 2412 protruding radially outwardly is provided on an outer surface of the nut bearing 2411, and because a separate fastening member is not required, thereby reducing the size of the motor in the axial direction.

Furthermore, the motor housing 1100 and the rotation constraining member 2520 are coupled by the tolerance ring 2530, and the bush member 2510 provided with the constraint hole 2512 is press-fitted the rear end of the second gear 2420 including the anti-rotation hole 2422 having an end of a depth longer than the stroke to support the rotation constraining member 2520, thereby perform anti-rotation and a sliding function. Furthermore, because the anti-rotation hole 2422 inside of the second gear 2420 is used as a rotation prevention means, there is an advantage of utilizing a space for a stroke.

Figure 9:
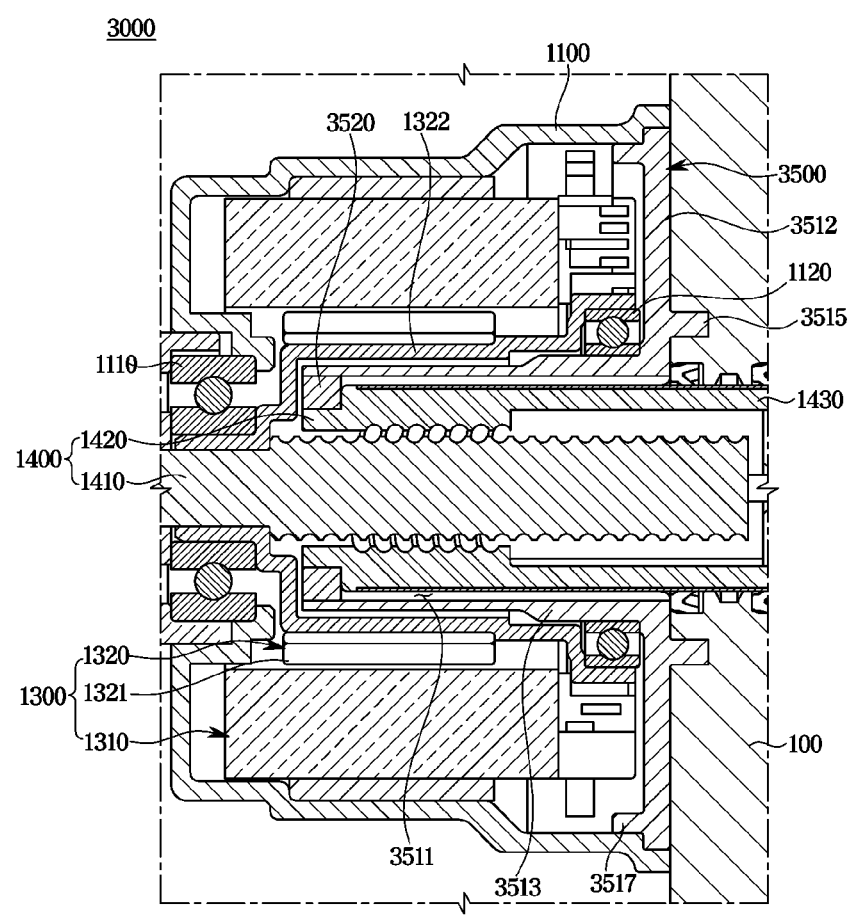
FIG. 9 is a combined cross-sectional view illustrating a part of a hydraulic pressure supply apparatus of an electronic brake system according to a third embodiment of the disclosure.
Figure 10:
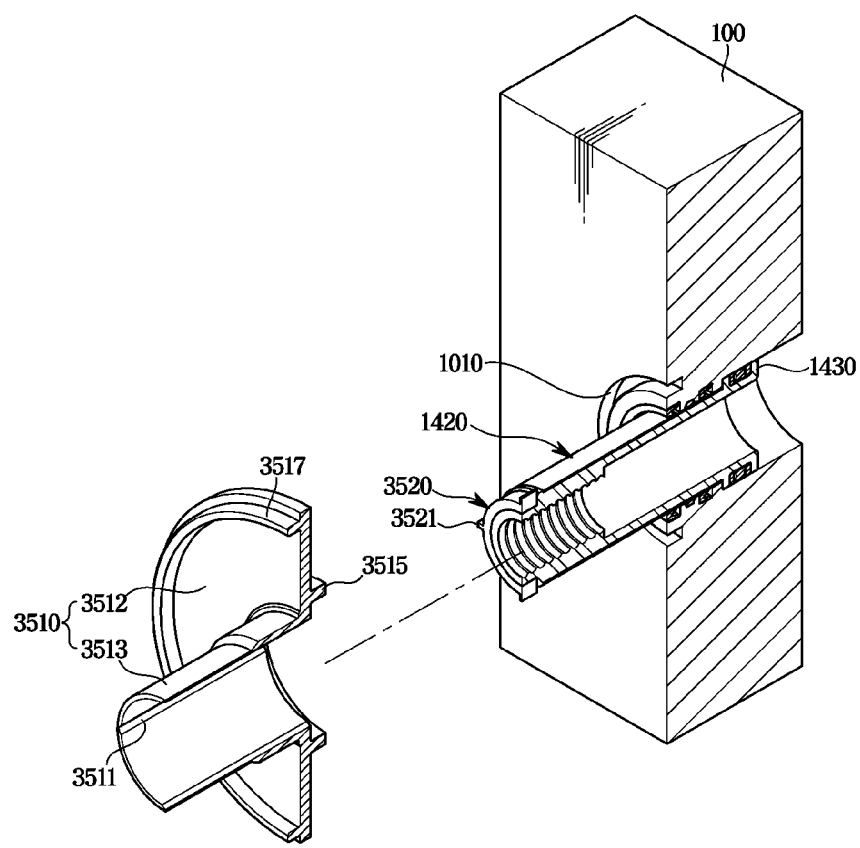
FIG. 10 is a partially-cut exploded perspective view with respect to the piston and the anti-rotation unit provided in the hydraulic pressure supply apparatus of the electronic brake system according to the third embodiment of the disclosure.

FIG. 9 is a combined cross-sectional view illustrating a part of a hydraulic pressure supply apparatus of an electronic brake system according to a third embodiment of the disclosure. FIG. 10 is a partially-cut exploded perspective view with respect to the piston and the anti-rotation unit provided in the hydraulic pressure supply apparatus of the electronic brake system according to the third embodiment of the disclosure. Herein, the same reference numerals as in the drawings of the first embodiment or the second embodiment shown above indicate members that perform the same function.

Referring to FIGS. 9 and 10, the hydraulic pressure supply apparatus 3000 according to the embodiment include the motor 1300 that is coupled to the modulator block 100 having flow paths and valves for adjusting the braking hydraulic pressure therein and has the stator 1310 and the rotor 1320, the gear unit including the first gear 1410 for converting the rotational motion of the motor 1300 into the linear motion and the second gear 1420 having the piston 1430 on one side, and an anti-rotation unit 3500 that prevents the second gear 1420 from rotating together with the first gear 1410.

The motor housing 1100 and the pump housing 1200 in FIG. 2 are respectively fastened to both sides of the modulator block 100. The motor housing 1100 is fastened to the left side of the modulator block 100 based on the drawings, and is provided with an internal space that may accommodate the motor 1300 and various components. The pump housing 1200 is fastened to the modulator block 100 from the opposite side of the motor housing 1100 to provide a chamber space so that the piston 1430 may linearly reciprocate therein.

The motor 1300 includes the stator 1310 and the rotor 1320, the rotor 1320 is spaced apart for each other inside the stator 1310 and includes the magnetic body 1321 and the rotating body 1322.

The housing bearing 1110 and the nut bearing 1120 may be provided between the motor housing 1100 and the rotating body 1322 of the motor 1300. The housing bearing 1110 is interposed between the motor housing 1100 and one end of the rotating body 1322 to rotatably support the rotating body 1322. The nut bearing 1120 is interposed between the bush member 3510 of the anti-rotation unit 3500, which is to be described later, and the other end of the rotating body 1322 extending toward the modulator block 100 to rotatably support the rotating body 1322.

The opening side of the motor housing 1100 is covered by the housing bearing 1110, one end of the rotating body 1322, the other end of the rotating body 1322, the bush member 3510, and the nut bearing 1120 to prevent foreign substances from entering the inside thereof. Accordingly, the stator 1310 and the rotor 1320 of the motor and various electrical components accommodated in the motor housing 1100 may be modularized with the motor housing 1100 to increase assembly with the modulator block 100. The bush member 3510 supports the inner ring of the nut bearing 1120, and the rotating body 1322 of the rotor supports the outer ring of the nut bearing 1120. For reference, in this embodiment, by omitting the constraining member 1130 disclosed in the first embodiment, the number of parts and assembly convenience may be greatly increased.

The gear unit 1400 includes the first gear 1410 that rotates together with the rotor 1320 and the second gear 1420 that converts the rotational motion delivered from the first gear 1410 into the linear motion. In other words, the first gear 1410 rotates together by being fixedly coupled to the rotor 1320, and the second gear 1410 allows the piston 1430 integrally formed at the rear thereof to perform the linear reciprocating motion.

The first gear 1410 and the second gear 1420 are coupled by a ball screw method, thereby converting the rotational motion into the linear reciprocating motion. To this end, the first gear 1410 is provided in the form of a screw shaft, and the second gear 1420 is provided in the form of a ball nut. Although not shown, a plurality of balls may be provided between the first gear 1410 and the second gear 1420 to reduce energy due to friction.

The piston 1430 includes a cylindrical body and a head having a larger diameter than the body. The body of the piston 1430, in which the second gear 1420 is integrally formed therein, is inserted into a hole formed in the modulator block 100 and moves forward and backward, and the head of the piston is provided in the structure in which movement thereof is restricted by being caught by the modulator block 100 when the body is moved backward. The piston 1430 may form hydraulic pressure required for braking through the front pump chamber 1220 in FIG. 4 when moving forward, and form hydraulic pressure through the rear pump chamber 1221 in FIG. 5 when moving backward.

As shown in FIGS. 9 and 10, the anti-rotation unit 3500 includes a bush member 3510 that has at least one slot 3511 formed on an inner surface along the moving direction of the piston 1430, and is fixedly coupled to the motor 1300 side in the modulator block 100, and a ring member 3520 that has s constraining protrusion 3521 inserted into the slot 3511, and is fastened to the second gear 1420.

The bush member 3510 may be coupled to an opening side of the motor housing 1100 coupled to the modulator block 100 as described above to cover the inside of the motor housing 1100. Accordingly, the stator 1310 and the rotor 1320 of the motor and various electrical components accommodated in the motor housing 1100 may be modularized integrally with the motor housing 1100 to increase assembly with the modulator block 100.

The bush member 3510 includes an annular disk-shaped flange bush 3512 coupled to the fastening groove 1010 of the modulator block 100, and a cylindrical guide bush 3513 protruding from the flange bush 3512 toward the motor 1300 and has the slot 3511. The flange bush 3512 is provided with a block protrusion 3515 coupled to the fastening groove 1010 of the modulator block 100 and a housing protrusion 3517 coupled to the motor housing 1100 in a stepwise protrusion on opposite ends, respectively. A plurality of the slots 3511 formed along the longitudinal direction on the inner surface of the guide bush 3513 may be provided parallel to each other at equal intervals in the circumferential direction, and at this time, the number of the constraining protrusions 3521 of the ring member 3520 are also be provided corresponding to the slots 3511, so that the rotation of the second gear 1420 by the rotation of the first gear 1410 may be stably restricted.

Furthermore, the bush member 3510 not only prevents the rotation of the piston 1430 on which the second gear 1420 is formed, but also compensates the vibration of the piston 1430 caused by the ball screw operation, so that the bush member 3510 may also serves as the piston guide to prevent deterioration of the sealing performance.

The ring member 3520 is assembled by press-fitting the serrated end of the motor 1300 side of the piston 1430 or the second gear 142. In particular, the ring member 3520 may be easily assembled from the bush member 3510 side to a insert tip 3521 of the second gear 1420 coupled through the piston side of the modulator block 100 to which the bush member 3510 is first fixed, as shown in FIG. 10.

Figure 11:
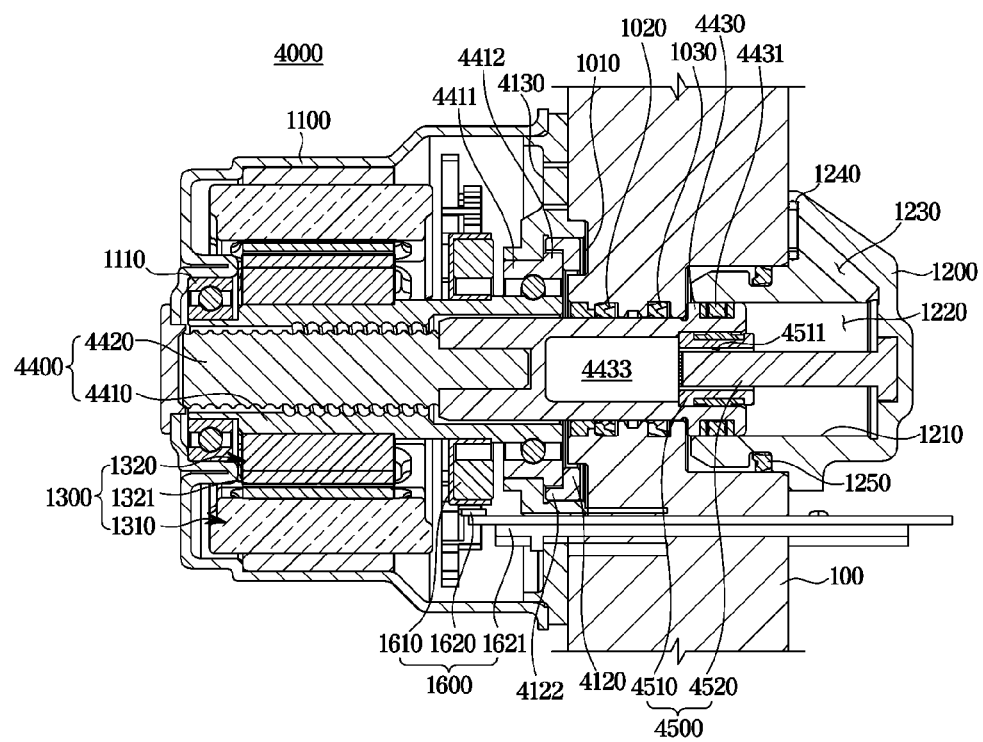
FIG. 11 is a cross-sectional view illustrating a hydraulic pressure supply apparatus of an electronic brake system according to a fourth embodiment of the disclosure.

On the other hand, in the hydraulic pressure supply apparatus 1000, 2000, and 3000 according to the above-described embodiments, the anti-rotation unit 1500, 2500, and 3500 are coupled to the modulator block 100 or coupled to the motor housing 1100 side to restrict rotation. Although it has been illustrated and described as doing this, it is not limited thereto, and it may have a structure in which the rotation is limited by being provided on the pump housing 1200 side. For example, the hydraulic pressure supply apparatus 4000 including an anti-rotation unit 4500 provided on the pump housing 1200 side is shown in FIG. 11. FIG. 11 is a cross-sectional view illustrating a hydraulic pressure supply apparatus of an electronic brake system according to a fourth embodiment of the disclosure. Herein, the same reference numbers as in the drawings of the embodiments shown above refer to members performing the same functions, and descriptions are omitted to prevent duplication of contents.

Referring to the drawings, the hydraulic pressure supply apparatus 4000 according to the embodiment includes a first gear 4410 rotating together with the rotor 1320, a second gear 4420 that is provided with a piston 4430 on one side thereof and is concentrically connected in a ball screw manner with the first gear 4410 to convert a rotational motion of the first gear 4410 into a linear motion, and an anti-rotation unit 4500 that prevents the second gear 4420 from rotating together with the first gear 4410.

The motor housing 1100 and the pump housing 1200 are respectively fastened to both sides of the modulator block 100. The motor housing 1100 is fastened to the left side of the modulator block 100 based on the drawings, and is provided to surround the motor 1300. The pump housing 1200 is fastened to the modulator block 100 from the opposite side of the motor housing 1100, and forms the cylinder 1210 in which the piston 4430 linearly reciprocates. At this time, the pump chamber 1220 into which the working fluid flows is formed in the space between the cylinder 1210 and the piston 4430.

The motor 1300 generates rotational force when power is supplied. The motor 1300 includes the stator 1310 and the rotor 1320, and the rotor 1320 is spaced apart from the inside of the stator 1310. The magnetic body 1321 is an element for generating the rotational force in the rotor 1320, and a plurality of them are installed on the outer surface of the rotor 1320, and at the time, a gap is formed between the magnetic body 1321 and the stator 1310 in order to rotate without interference.

A gear unit 4400 includes a first gear 4410 that rotates together with the rotor 1320 and a second gear 4420 that converts a rotational kinetic energy delivered from the first gear 4410 into a linear kinetic energy. In other words, the gear unit 4400 performs a function of converting the rotational motion of the rotor 1320 into the linear motion. The first gear 4410 is fixedly coupled to the rotor 1320 and rotates therewith, and the second gear 4420 coupled to the rear side of the piston 4430 performs the linear reciprocating motion.

Herein, the first gear 4410 and the second gear 4420 may be coupled by a ball screw manner to convert the rotational motion into the linear reciprocating motion. To this end, the first gear 4410 may be provided in the form of a ball nut, and the second gear 4420 may be provided in the form of a screw shaft. In other words, a thread is formed on the outer circumferential surface of the second gear 4430, and a thread groove corresponding to the thread is formed on the inner circumferential surface of the first gear 4410. Accordingly, when the first gear 4410 rotates, the second gear 4420, which is constrained not to rotate by the anti-rotation unit 4500 to be described later, performs the relatively linear motion. At this time, although not shown, a plurality of balls may be provided between the first gear 4410 and the second gear 4420 to reduce energy due to friction.

A nut bearing 4411 for a shaft support may be integrally provided on the first gear 4410. Furthermore, the housing bearing 1110 has the outer diameter part fastened to the motor housing 1100 and an inner diameter part rotatably supporting the first gear 4410, after all, the nut bearing 4411 is located on the modulator block 100 side, and the housing bearing 1110 is positioned on the outside of the stator 1310, so that the first gear 4410 is stably supported in front and rear sides by the nut bearing 4411 and the housing bearing 1110, respectively.

A flange portion 4412 protruding outward in the radial direction is provided on the outer surface of the nut bearing 4411 to support an axial force. The flange portion 4412 is fitted between a seating bush 4120 and a constraining member 4130 to be constrained. In other words, the seating bush 4120 is fitted in the fastening groove 1010 formed in the modulator block 100, and has a protrusion 4122 extending in the direction of the motor 1300 on the outer surface thereof. Furthermore, the constraining member 4130 is fitted and fixedly coupled to the fastening groove 1010 together with the seating bush 4120, and is provided to surround the outer surfaces of the seating bush 4120 and the nut bearing 4411 to cover the opening side of the motor housing 1100.

One end of the second gear 4420 is press-fitted with the piston 4430, and is disposed inside the first gear 4410. In this case, a part of the piston 4430 press-fitted with the second gear 4420 is disposed inside the first gear 4410. Accordingly, the overall length of the piston 4430 in the longitudinal direction may be minimized Meanwhile, as the piston 4430 is press-fitted to the second gear 4420, the piston 4430 moves together when the second gear 4420 moves in a straight line.

The piston 4430 is provided with a structure in which a body thereof is inserted into a hole formed in the modulator block 100, and a head thereof is provided in the structure in which movement thereof is restricted by being caught by the modulator block 100 when the body is moved backward. The piston 4430 is provided in a structure in which a hole is formed at the rear end thereof, and the second gear 4420 is press-fitted into the hole. Accordingly, when the second gear 4420 moves forward and backward, the piston 4430 may also reciprocate forward and backward therewith. The piston 4430 is provided with a piston hole 4433 in which the bush member 4510 of the anti-rotation unit 4500, which will be described later, is fitted in front thereof, and a piston sealing member 4431 for sealing the space between the piston 4430 and the cylinder 1210. At this time, the piston hole 4433 is provided with one side open and the other end closed. This is to smoothly pressurize the pump chamber 1220 when the piston 4430 advances. Herein, a case in which the piston 4430 moves to the right in the drawing is forward, and a case in which the piston 4430 moves to the left is backward.

The pump chamber 1220 is provided in front of the piston 4430, and forms hydraulic pressure in the working fluid accommodated in the pump chamber 1220 when the piston 4430 advances. The working fluid accommodated in the pump chamber 1220 whose volume is changed by the piston 4430 flows in and out toward the modulator block 100 through the flow path 1230.

The anti-rotation unit 4500 is installed in the pump housing 1200 to prevent rotation of the piston 4430. In other words, the anti-rotation unit 4500 is provided to prevent rotation of the piston 4430 and thereby prevent rotation of the second gear 4420 press-fitted with the piston 4430. The anti-rotation unit 4500 may include a bush member 4510 that has an anti-rotation hole 4511 having a polygonal cross-section and fastened to a piston hole 4433 provided in front of the piston 4300, and a rotation constraining member 4520 has one end fixed to the pump housing 1200 and the other end that is inserted into the anti-rotation hole 4511 to prevent rotation of the piston 4430.

The anti-rotation hole 4511 is provided to pass through the bush member 4510 and communicates with the piston hole 4433 in a straight line. Furthermore, the rotation constraining member 4520 is provided in the form of a shaft having a cross section corresponding to the anti-rotation hole 4511 and is inserted into the anti-rotation hole 4511. In other words, the rotation of the bush member 4510 coupled to the piston 4430 is restricted by the rotation constraining member 4520, thereby restricting the rotation of the piston 4430. Accordingly, the rotation of the second gear 4420 press-fitted to the piston 4430 is also restricted, so that the rotational motion of the first gear 4410 may be converted into the linear motion. At this time, when the second gear 4420 and the piston 4430 move together in the linear motion, the rotation constraining member 4520 guides the movement of the piston 4430 without interference by the inside of the anti-rotation hole 4511 of the bush member 4510 and the piston hole 4433, thereby restricting the rotation.

On the other hand, a tolerance ring installed on the outer circumferential surface of the bush member 4510 to be coupled to the piston 4430 may be included. The tolerance ring allows relative rotational motion with respect to the piston 4430 when a torque greater than an allowable value is applied to the piston 4430, thereby preventing the rotation constraining member 4520 being damaged or destroyed even when excessive torque is generated due to a collision, or preventing idle rotation due to damage of the fastening part in advance. The tolerance ring 2530 may perform its original function by the restoring force even after a collision.

Figure 12:
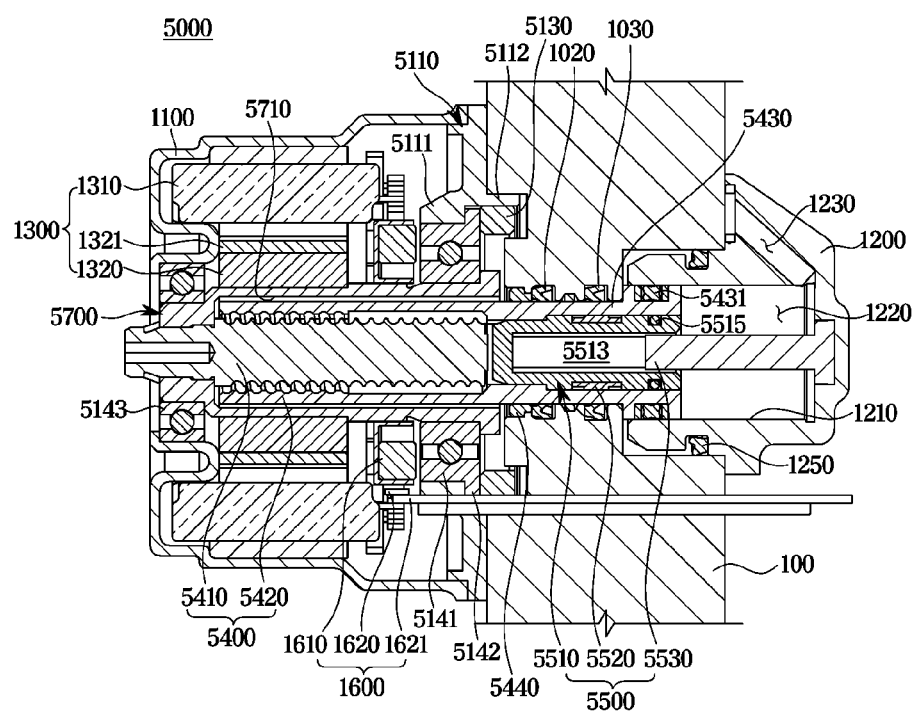
FIG. 12 is a cross-sectional view illustrating a hydraulic pressure supply apparatus of an electronic brake system according to a fifth embodiment of the disclosure.
Figure 13:
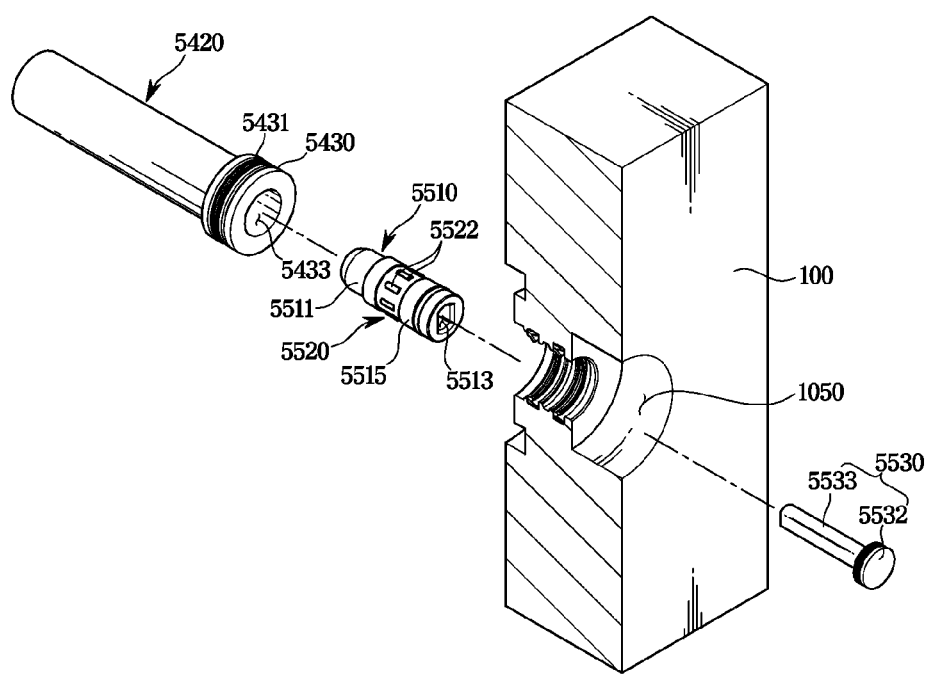
FIG. 13 is an exploded perspective view illustrating an assembly state of the anti-rotation unit provided in the hydraulic pressure supply apparatus of the electronic brake system according to the fifth embodiment of the disclosure.
Figure 14:
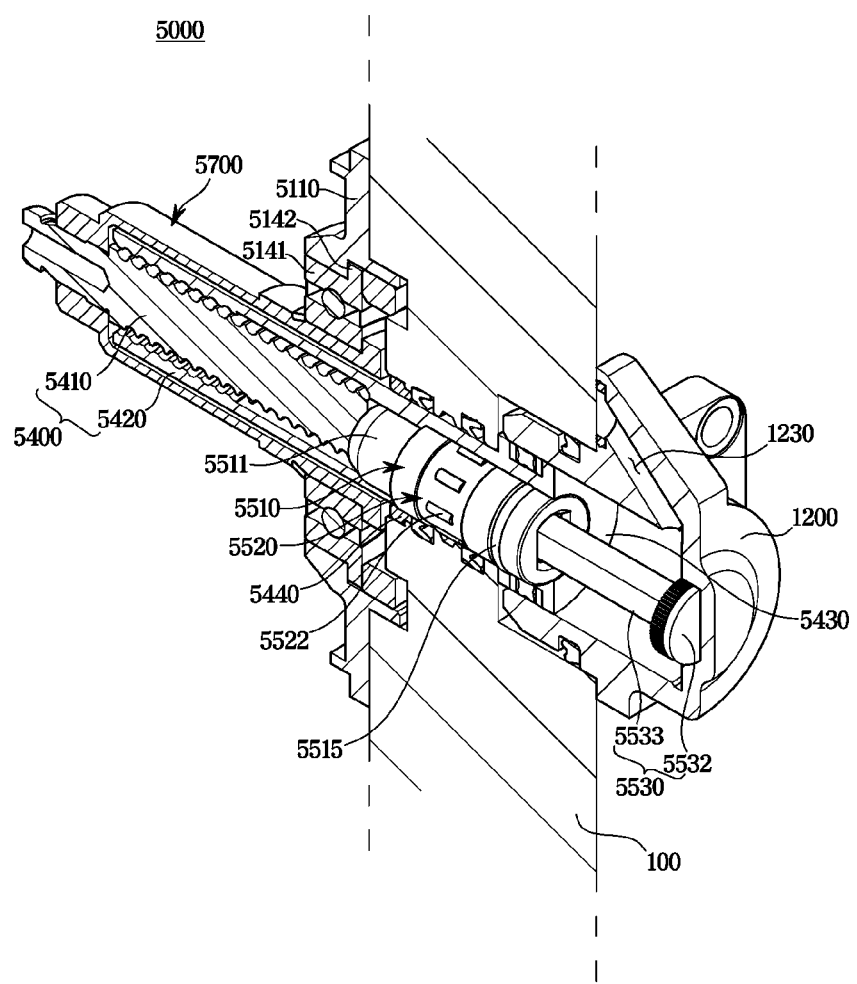
FIG. 14 is a partially-cut perspective view showing a state in which the anti-rotation unit of FIG. 13 is assembled.

FIG. 12 is a cross-sectional view illustrating a hydraulic pressure supply apparatus of an electronic brake system according to a fifth embodiment of the disclosure. FIG. 13 is an exploded perspective view illustrating an assembly state of the anti-rotation unit provided in the hydraulic pressure supply apparatus of the electronic brake system according to the fifth embodiment of the disclosure. FIG. 14 is a partially-cut perspective view showing a state in which the anti-rotation unit of FIG. 13 is assembled. Herein, the same reference numerals as in the drawings of the embodiments shown above indicate members that perform the same functions.

Referring to FIGS. 12 to 14, the hydraulic pressure supply apparatus 5000 according to the embodiment includes the motor 1300 coupled to the modulator block 100, a sleeve 5700 coupled to the rotor 1320 of the motor 1300, a first gear 5410 that is fastened to the sleeve 5700 and rotates together with the sleeve 5700, a second gear 5420, in which a piston 5430 is provided at one end thereof, converting the rotational motion of the first gear 5410 into the linear motion, and an anti-rotation unit 5500 for preventing the piston 5430 from rotating together with the first gear 5410.

The modulator block 100 is connected to a hydraulic pressure supply apparatus and a master cylinder (not shown), so that flow paths are formed therein to transfer braking hydraulic pressure to the wheel cylinders provided on each wheel, and a plurality of valves are installed in place. In other words, the modulator block 100 is connected to the master cylinder and the hydraulic pressure supply apparatus, and serves to transmit the braking hydraulic pressure generated therefrom. The modulator block 100 is a well-known technology widely used in an electronic brake system, so a detailed description thereof will be omitted.

The motor housing 1100 and the pump housing 1200 are respectively fastened to both sides of the modulator block 100.

The motor housing 1100 is fastened to the left side of the modulator block 100 based on the drawings, and is provided to surround the motor 1300 to be described later. Furthermore, a constraining member 5110 is interposed between the motor 1300 and the modulator block 100 disposed in the motor housing 1100. In other words, the motor housing 1100 is fastened to the modulator block 100 in a state coupled to the constraining member 5110.

The pump housing 1200 is fastened to the modulator block 100 from the opposite side of the motor housing 1100, and forms the cylinder 1210 in which the piston 5430 linearly reciprocates. At this time, the pump chamber 1220 into which the working fluid is introduced is formed in the space between the cylinder 1210 and the piston 5430, and the pump sealing member 1250 for preventing the outflow of the working fluid is provided on one side of the outer surface of the pump housing 1200.

The motor 1300 is a device that receives power and generates a rotational force. The motor 1300 may be a hollow motor having the stator 1310 and the rotor 1320 installed in the motor housing 1100. The rotor 1320 has a cylindrical shape with a hollow center, and the magnetic bodies 1321 are installed at predetermined intervals along the outer circumferential surface thereof. The stator 1310 is spaced apart from the rotor 1320 at a predetermined interval and is formed to surround the rotor 1320. A coil (not shown) is wound around the stator 1310, and when power is applied, a repulsive force and an attractive force are applied between the magnetic bodies1321 and the coil to rotate the rotor 1320. The structure of the rotor 1320 and the stator 1310 of the motor 1300 is a well-known technique, so a detailed description thereof will be omitted.

On the other hand, as the hydraulic pressure supply apparatus 5000 according to the disclosure is applied and used in an electronic brake system, the motor 1300 may operate through an electrical signal of the pedal displacement sensor (not shown) that detects the displacement in response to the pedal effort of the brake pedal. In other words, the motor rotates forward and reverse to perform braking force required by the driver to generate rotational force.

The sleeve 5700 is disposed in the center of the motor 1300 and is provided to rotate together with the rotor 1320. The sleeve 5700 may be provided in a cylindrical shape in which an accommodation space 5710 is formed therein by being hollow in the longitudinal direction. In this case, a rear side of the sleeve 5700 may be provided with a reduced inner diameter for coupling with the first gear 5410 to be described later. The sleeve 5700 may be supported by bearings 5141 and 5143 to be stably rotatable together with the rotor 1320.

As shown in the drawings, a front bearing 5141 and a rear bearing 5143 are respectively provided at the front and rear sides of the sleeve 5700 to rotatably support the sleeve 5700.

The rear bearing 5413 is interposed between the motor housing 1100 and the sleeve 5700 to support the rear side of the sleeve 5700, and the front bearing 5141 is interposed between the constraining member 5110 and the sleeve 5700 to support the front side of the sleeve 5700. In other words, the front bearing 5141 and the rear bearing 5143 stably support the sleeve 5700 at the front and rear sides thereof, so that when the rotor 1320 rotates, it rotates together with the sleeve 5700 without shaking.

On the other hand, the front bearing 5141 may be integrally provided with a flange portion 5142 protruding in the radial direction to support the axial force on the outer surface forming the outer ring. A support portion 5111 for supporting a rear of the flange portion 5142 of the front bearing 5141 is provided on the constraining member 5110 so that the front bearing 5141 is stably bound together with the flange portion 5142. Furthermore, a constraining ring 5130 interposed between the constraining member 5110 and the modulator block 100 may be further provided to support a front side of the front bearing 5141. The constraining ring 5130 is installed on a protrusion 5112 of the constraining member 5110 protruding to fit into the fastening groove 1010 formed in the modulator block 100. Accordingly, the motor 1300, the motor housing 1100, the constraining member 5110, the front bearing 5141, the rear bearing 5143, the constraining ring 5130, and the sleeve 5700 may be provided as one assembly.

The gear unit 5400 includes the first gear 5410 that rotates together with the rotor 1320, and the second gear 5420 that converts the rotational kinetic energy delivered from the first gear 5410 into the linear kinetic energy.

The first gear 5410 is provided in the form of a screw shaft that is press-fitted into the sleeve 5700 and rotates together with the sleeve 5700. In other words, a thread groove is formed on the outer circumferential surface of the first gear 5410. The first gear 5410 is disposed in the accommodation space 5710 to be spaced apart from the inner circumferential surface of the sleeve 5700 by a predetermined distance, and the rear thereof is press-fitted and fixed to the other end side of the sleeve 5700 to rotate together with the sleeve 5700.

The piston 5430 has a cylindrical shape in which a piston hole 5433 having an interior hollow in the longitudinal direction is formed. Furthermore, the piston 5430 has the second gear 5420 for converting the rotational motion of the first gear 5410 into the linear motion by being concentrically connected in a ball-screw manner with the first gear 5410. In other words, the second gear 5420 may be integrally formed with the piston 5430. The second gear 5420 is disposed in the accommodation space of the sleeve 5700 and may be provided in the form of a ball nut surrounding the first gear 5410. Accordingly, the second gear 5420 may have a thread groove corresponding to the thread groove of the first gear 5410. At this time, although not shown, a plurality of balls may be provided between the first gear 5410 and the second gear 5420 to reduce energy due to friction.

On the other hand, the rear side of the piston 5430 provided with the second gear 5420 is provided to be disposed in the accommodation space 5710 of the sleeve 5700, so that minimizing the increase in the overall length of the system is possible even if the first gear 5410 and the piston 5430 are coaxially disposed.

Furthermore, the piston 5430 is provided so that the front side thereof is exposed in the right direction of the modulator block 100 through a through hole 1050 formed in the modulator block 100, and the front side thereof is provided in the structure in which movement is restricted by being caught by the modulator block 100 when retracting. For example, the piston 5430 may include a cylindrical body and a head having a larger diameter than the cylindrical body. Accordingly, the piston 5430 is provided with a structure in which the cylindrical body is inserted into the through hole 1050 formed in the modulator block 100 and proceeds forward and backward, and the head thereof is provided in the structure in which movement is restricted by being caught by the modulator block 100 when retracting. Herein, it is assumed that the case where the piston 5430 moves to the right in the drawing is forward, and the case where the piston 5430 moves to the left is backward. In other words, the piston 5430 converts the rotational force of the motor 1300 into the linear motion to pressurize the pump chamber 1220 of the cylinder 1210 formed in the front, thereby forming hydraulic pressure in the working fluid accommodated in the pump chamber 1220. Accordingly, the working fluid accommodated in the pump chamber 1220 flows into and out of the internal flow path (not shown) of the modulator block 100 through the flow path 1230 formed in the pump housing 1200. On the other hand, when the piston 5430 moves forward, another pump chamber (not shown)

forming a closed space by the piston 5430, the modulator block 100, and the pump housing 1200 may be provided at the rear side thereof. In other words, the front pump chamber 1220 and the rear pump chamber are respectively formed in front and rear sides of the piston 5430 with reference to the drawings. When the piston 5430 advances, hydraulic pressure may be formed through the front pump chamber 1220, and when the piston 5430 moves forward, hydraulic pressure may be formed through the rear pump chamber. Reference numeral 5431, which has not been described, is a piston sealing member installed on the piston 5430 to seal the space between the piston 5430 and the cylinder 1210.

On the other hand, when the piston 5430 moves through the through hole 1050 of the modulator block 100, a guide bush 5440 fitted to the outer circumferential surface of the piston 5430 to prevent vibration of the piston 5430 and fixed to the modulator block 100 may be further provided. The guide bush 5440 not only prevents vibration of the piston 5430, but also serves to hold the concentricity of the piston 5430.

Furthermore, first and second sealing members 1020 and 1030 are provided between the piston 5430 and the modulator block 100 to prevent leakage of the working fluid. Because the guide bush 5440 holds the concentricity of the piston 5430 and prevents vibration, the sealing performance of the first and second sealing members 1020 and 1030 in contact with the piston 5430 may be prevented from being deteriorated.

As described above, the rotation of the piston 5430 is restricted by the anti-rotation unit 5500 so that the piston 5430 moves linearly by converting the rotational motion of the rotor 1320 into the linear motion.

The anti-rotation unit 5500 may include a bush member 5510 that has an anti-rotation hole 5513 having a polygonal cross section and fastened to a piston hole 5433 provided in front of the piston 5430, and a rotation constraining member 5530 has one end thereof fixed to the pump housing 1200 and the other end thereof that is inserted into the anti-rotation hole 5513 to prevent rotation of the piston 5430.

The bush member 5510 has a predetermined length and is inserted into the piston hole 5433 so as to close the piston hole 5433, and has a fastening body 5511 having one end closed and the other end open. In other words, the anti-rotation hole 5513 having a polygonal cross-section is provided at one end of the opened end. The fastening body 5511 is mounted and fixed to the piston hole 5433 and is provided to move together with the piston 5430. Furthermore, a bush sealing member 5515 is installed on the fastening body 5511 to prevent the working fluid from leaking between the piston 5430 and the fastening body 5511.

Furthermore, the bush member 5510 includes a tolerance ring 5520 that is fastened to the piston 5430 along the outer circumferential surface of the fastening body 5511. The tolerance ring 5520 allows a relative rotational motion for the piston 5430 when a torque greater than an allowable value is applied to the piston 5430. In other words, the tolerance ring 5520 has a protrusion shape on its outer surface and the protrusion is provided with an elastic part 5522 that is deformable by an external force. Even when an excessive load by the rotation of the gear 5410 and the axial direction due to a collision is applied, the rotation is enabled, thereby preventing damage to related components. Furthermore, even after the collision, the original function may be performed by the restoring force of the tolerance ring 5520.

On the other hand, the bush sealing member 5515 is provided on the front side of the tolerance ring 5520. In other words, the bush sealing member 5515 is provided between the tolerance ring 5520 and one end of the fastening body 5511. This is to prevent the performance of the pump from being deteriorated according to the operation of the piston 5430 due to air bubbles generated around the tolerance ring 5520 between the piston 5430 and the fastening body 5511.

The rotation constraining member 5530 includes a constraining shaft 5532 press-fitted and fixed to the pump housing 1200 and a guide shaft 5533 protruding from the constraining shaft 5532.

The constraining shaft 5532 may be assembled by being press-fitted into the pump housing 1200 by having an outer circumferential surface serrated.

The guide shaft 5533 has a cross section corresponding to that of the anti-rotation hole 5513 and is inserted into the anti-rotation hole 5513. Accordingly, the rotation of the piston 5430 is restricted by preventing the rotation of the bush member 5510 coupled to the piston 5430. Furthermore, because the rotation of the piston 5430 is restricted, when the rotor 1320, the sleeve 5700, and the first gear 5410 rotate together, the second gear 5420 of the piston 5430 may convert the rotational motion into the linear motion.

On the other hand, according to an embodiment of the disclosure, the hydraulic pressure supply apparatus 5000 may further include the position sensor unit 1600 to effectively detect the forward distance of the piston 5430.

The position sensor unit 1600 includes the sensing magnet 1610 fixed to the outer circumferential surface of the sleeve 5700 and rotating in the circumferential direction of the sleeve 5700, and the sensing unit 1620 spaced apart from the sensing magnet 1610 and detecting a magnetic field change by the sensing magnet 1610, and the position sensor unit 1600 measures an amount of rotation. In other words, information sensed by the sensing unit 1620 is transmitted to the ECU (not shown) through the electrically connected the connector 1621, and the ECU grasps the movement of the piston 5430 based on this, thereby controlling the operation of the motor 1300.

To assemble the hydraulic pressure supply apparatus 5000 as described above, first, after assembling the modulator block 100, the motor 1300, and the motor housing 1100, the first gear 5410 and the piston 5430 assembly is press-fitted to the sleeve 5700 through the through hole 1050 of the modulator block. Next, after assembling the bush member 5510 of the anti-rotation unit 5500 in the piston hole 5433, finally the pump housing 1200 in which the rotation constraining member 5530 of the anti-rotation unit 5500 is installed is coupled to the modulator block, resulting in completing the assembly. As a result, since the structure of the hydraulic pressure supply apparatus 5000 is simplified, the assembly process is facilitated, so that the productivity of the product may be improved.

Although a few embodiments of the present disclosure have been shown and described, it would be appreciated by those skilled in the art that changes may be made in these embodiments without departing from the principles and spirit of the disclosure, the scope of which is defined in the claims and their equivalents.

The invention claimed is:

1. A hydraulic pressure supply apparatus of an electronic brake system, the hydraulic pressure supply apparatus comprising:
a motor coupled to a modulator block having a flow path and a valve for adjusting braking hydraulic pressure therein, the motor having a stator and a rotor disposed to be spaced apart from an inner circumferential surface of the stator;

a first gear configured to receive a rotational force from the rotor and rotating together with the rotor;
a second gear provided with a piston on one side thereof and concentrically connected with the first gear in a ball screw manner to convert a rotational motion of the first gear into a linear motion; and
an anti-rotation unit configured to prevent the second gear from rotating together with the first gear,
wherein
the first gear is provided as a screw shaft, and the second gear is provided as a ball nut, the first gear and the second gear converting the rotational motion into the linear motion by a ball screw manner,
the anti-rotation unit comprises:
a bush member including at least one slot formed on an inner circumferential surface thereof in a moving direction of the piston and coupled to the modulator block; and
a ring member coupled to the second gear and provided with a constraining protrusion inserted into the at least one slot,
the constraining protrusion is configured to restrict rotation of the second gear while moving along the at least one slot when the piston is operated,
a nut bearing is interposed between the bush member and the rotor, and
the bush member is configured to support an inner ring of the nut bearing, and the rotor is configured to support an outer ring of the nut bearing.

2. The hydraulic pressure supply apparatus of claim 1, wherein
the bush member comprises an annular disk-shaped flange bush fixed to the modulator block, and a guide bush protruding from the flange bush toward the motor and having the at least on slot formed on an inner circumferential surface thereof.

3. The hydraulic pressure supply apparatus of claim 1, further comprising:
a motor housing accommodating the stator and the rotor, and coupled to the modulator block;
a constraining member coupled to an opening side of the motor housing coupled to the modulator block; and
a nut bearing interposed between the constraining member and the rotor;
wherein the constraining member is configured to support an outer ring of the nut bearing, and the rotor is configured to support an inner ring of the nut bearing.

4. The hydraulic pressure supply apparatus of claim 1, further comprising:
a motor housing accommodating the stator and the rotor, and coupled to the modulator block,
wherein the bush member is configured to cover an inside of the motor housing by coupling to an opening side of the motor housing coupled to the modulator block.

5. The hydraulic pressure supply apparatus of claim 1, wherein
the first gear is coupled to the rotor by a tolerance ring, and
the tolerance ring is configured to allow a relative rotational motion for the rotor when a torque greater than an allowable value is applied to the first gear.

6. The hydraulic pressure supply apparatus of claim 1, further comprising:
a position sensor unit including a sensing magnet fastened to an outer circumferential surface of the first gear and rotating together with the first gear, and a sensing unit measuring a rotation amount of the sensing magnet by detecting a change in a magnetic field.

7. A hydraulic pressure supply apparatus of an electronic brake system, the hydraulic pressure supply apparatus comprising:
a motor coupled to a modulator block having a flow path and a valve for adjusting braking hydraulic pressure therein, the motor having a stator and a rotor disposed to be spaced apart from an inner circumferential surface of the stator;
a first gear configured to receive a rotational force from the rotor and rotating together with the rotor;
a second gear provided with a piston on one side thereof and concentrically connected with the first gear in a ball screw manner to convert a rotational motion of the first gear into a linear motion; and
an anti-rotation unit configured to prevent the second gear from rotating together with the first gear,
wherein
the first gear is provided as a ball nut, and the second gear is provided as a screw shaft, the first gear and the second gear converting a rotational motion into a linear motion by a ball screw manner,
an anti-rotation hole is formed on the other side of the second gear, and
the anti-rotation unit comprises a rotation constraining member installed on a motor housing and having a guide shaft protruding to be inserted into the anti-rotation hole.

8. The hydraulic pressure supply apparatus of claim 7, wherein
the rotation constraining member comprises a fastening body from which the guide shaft protrudes, and a tolerance ring provided on an outer circumferential surface of the fastening body and fastened to the motor housing, and
the tolerance ring is configured to allow a relative rotational motion for the motor housing when a torque greater than an allowable value is applied to the rotation constraining member.

9. The hydraulic pressure supply apparatus of claim 7, wherein
the anti-rotation unit further comprises a bush member having a constraint hole through which the guide shaft passes, and coupled to the other side of the second gear.

10. The hydraulic pressure supply apparatus of claim 7, further comprising:
a position sensor unit including a sensing magnet fastened to an outer circumferential surface of the first gear and rotating together with the first gear, and a sensing unit measuring a rotation amount of the sensing magnet by detecting a change in a magnetic field.

11. A hydraulic pressure supply apparatus of an electronic brake system, the hydraulic pressure supply apparatus comprising:
a motor coupled to a modulator block having a flow path and a valve for adjusting braking hydraulic pressure therein, the motor having a stator and a rotor disposed to be spaced apart from an inner circumferential surface of the stator;
a first gear configured to receive a rotational force from the rotor and rotating together with the rotor;
a second gear provided with a piston on one side thereof and concentrically connected with the first gear in a ball screw manner to convert a rotational motion of the first gear into a linear motion; and an anti-rotation unit configured to prevent the second gear from rotating together with the first gear, wherein the first gear is provided as a ball nut, and the second gear is provided as a screw shaft, a nut bearing for a shaft support is integrally provided with the first gear, and the hydraulic pressure supply apparatus further comprises:

a seating bush fitted into a fastening groove formed in the modulator block and having a protrusion extending in a motor direction at an edge thereof;

a constraining member that covers the seating bush from the outside thereof and is coupled to the modulator block, wherein a flange portion protruding outward in a radial direction is integrally provided on an outer surface of the nut bearing, and the flange portion is fitted and constrained between the seating bush and the constraining member.

12. The hydraulic pressure supply apparatus of claim 11, further comprising:

a position sensor unit including a sensing magnet fastened to an outer circumferential surface of the first gear and rotating together with the first gear, and a sensing unit measuring a rotation amount of the sensing magnet by detecting a change in a magnetic field.

13. A hydraulic pressure supply apparatus of an electronic brake system, the hydraulic pressure supply apparatus comprising:

a motor coupled to a modulator block having a flow path and a valve for adjusting braking hydraulic pressure therein, the motor having a stator and a rotor disposed to be spaced apart from an inner circumferential surface of the stator;

a first gear configured to receive a rotational force from the rotor and rotating together with the rotor;

a second gear provided with a piston on one side thereof and concentrically connected with the first gear in a ball screw manner to convert a rotational motion of the first gear into a linear motion:

an anti-rotation unit configured to prevent the second gear from rotating together with the first gear; and a sleeve coupled to the rotor to rotate together with the rotor, and having an accommodation space formed in a center thereof.

14. The hydraulic pressure supply apparatus of claim 13, further comprising:

a motor housing accommodating the stator and the rotor, and coupled to the modulator block; and a pump housing coupled to the modulator block from the opposite side the motor housing, and forming a cylinder such that the piston passing through the modulator block reciprocates linearly.

15. The hydraulic pressure supply apparatus of claim 14, wherein the anti-rotation unit comprises:

a bush member including an anti-rotation hole having a polygonal cross section, the bush member fastened to a piston hole formed in the piston; and a rotation constraining member inserted into the anti-rotation hole to restrict the rotation of the bush member.

16. The hydraulic pressure supply apparatus of claim 15, wherein the bush member comprises a fastening body provided with the anti-rotation hole, and a tolerance ring installed on an outer circumferential surface of the fastening body to fastened to the piston; and the tolerance ring is configured to allow a relative rotational motion for the piston when a torque greater than an allowable value is applied to the piston.

17. The hydraulic pressure supply apparatus of claim 15, wherein the rotation constraining member comprises:

a constraining shaft press-fitted and fixed to the pump housing, the constraining shaft having an outer circumferential surface serrated, and a guide shaft protruding from the constraining shaft and having a cross section corresponding to the anti-rotation hole.

18. The hydraulic pressure supply apparatus of claim 13, further comprising:

a front bearing and a rear bearing installed on front and rear sides of the sleeve to rotatably support the sleeve, respectively, wherein a flange portion protruding in a radial direction is integrally provided on an outer surface of the front bearing to support an axial force.

19. The hydraulic pressure supply apparatus of claim 18, further comprising:

a motor housing accommodating the stator and the rotor, and coupled to the modulator block;

a constraining member interposed between the modulator block and the motor housing to support a rear of the flange portion; and a constraining ring provided in the constraining member to support a front of the flange portion.

20. The hydraulic pressure supply apparatus of claim 13, further comprising:

a position sensor unit including a sensing magnet fastened to an outer circumferential surface of the first gear and rotating together with the first gear, and a sensing unit measuring a rotation amount of the sensing magnet by detecting a change in a magnetic field.

* * * * *